United States Patent
Yamato

(10) Patent No.: US 12,234,044 B2
(45) Date of Patent: Feb. 25, 2025

(54) WILDLIFE WARNING SYSTEM FOR AERIAL VEHICLE

(71) Applicant: Rakuten Group, Inc., Tokyo (JP)

(72) Inventor: Takumi Yamato, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 1116 days.

(21) Appl. No.: 16/978,899

(22) PCT Filed: Oct. 15, 2019

(86) PCT No.: PCT/JP2019/040501
§ 371 (c)(1),
(2) Date: Sep. 8, 2020

(87) PCT Pub. No.: WO2021/074968
PCT Pub. Date: Apr. 22, 2021

(65) Prior Publication Data
US 2023/0127058 A1    Apr. 27, 2023

(51) Int. Cl.
*B64U 30/29*    (2023.01)
*A01M 29/16*   (2011.01)
*B64C 39/02*    (2023.01)
*B64U 101/40*  (2023.01)

(52) U.S. Cl.
CPC .......... *B64U 30/29* (2023.01); *A01M 29/16* (2013.01); *B64C 39/02* (2013.01); *B64U 2101/40* (2023.01)

(58) Field of Classification Search
CPC .......... B64U 30/29; A01M 29/16; B64C 7/00; B64C 27/04
See application file for complete search history.

(56) References Cited

U.S. PATENT DOCUMENTS

| | | | | |
|---|---|---|---|---|
| 1,540,023 A | * | 6/1925 | Kollinek | G10K 9/04 |
| | | | | 116/DIG. 44 |
| 1,781,266 A | * | 11/1930 | Bruni | G09F 21/06 |
| | | | | 181/186 |
| 2,392,394 A | * | 1/1946 | Lear | G10K 7/06 |
| | | | | 244/113 |
| 2,409,131 A | * | 10/1946 | Lear | G10K 7/06 |
| | | | | 244/1 R |
| 2,432,078 A | * | 12/1947 | Adler, Jr. | B64D 47/02 |
| | | | | 244/1 R |

(Continued)

FOREIGN PATENT DOCUMENTS

| | | | |
|---|---|---|---|
| CA | 2780249 A1 * | 12/2013 | ............ A01M 29/16 |
| CN | 201204895 Y | 3/2009 | |

(Continued)

OTHER PUBLICATIONS

Translation of CN 104354860 A (Year: 2015).*
"Concord Technical Spec: Powerplant," ConcordeSST.com, Jun. 6, 2019 (Year: 2019).*

*Primary Examiner* — Joshua J Michener
*Assistant Examiner* — Ryan Andrew Yankey
(74) *Attorney, Agent, or Firm* — Sughrue Mion, PLLC

(57) ABSTRACT

An aerial vehicle according to the present invention includes: at least one rotor configured to generate an air flow for lifting; and at least one sound producing structure having an opening and configured to produce sound for scaring birds and animals when the air flow generated by the rotor causes air to flow into the opening.

13 Claims, 18 Drawing Sheets

(56) References Cited

U.S. PATENT DOCUMENTS

| | | | | |
|---|---|---|---|---|
| 2,629,572 | A | * | 2/1953 | Grinnan .................. G10K 5/00 |
| | | | | 244/117 R |
| 4,964,331 | A | * | 10/1990 | Halevy ................ A01M 29/06 |
| | | | | 89/27.3 |
| 11,359,544 | B2 | * | 6/2022 | O'Brien .............. B64C 29/0033 |
| 11,511,864 | B2 | * | 11/2022 | Coquillat ............... B64D 33/02 |
| 2012/0113754 | A1 | * | 5/2012 | Husseiny .............. A01M 29/16 |
| | | | | 367/139 |
| 2014/0060419 | A1 | * | 3/2014 | Gardner ............... A01M 29/18 |
| | | | | 116/22 A |
| 2017/0251659 | A1 | * | 9/2017 | Pereca ................. A01M 29/16 |
| 2018/0077918 | A1 | * | 3/2018 | Yu ......................... B64C 39/024 |
| 2022/0363382 | A1 | * | 11/2022 | McCann ............... B64U 20/94 |

FOREIGN PATENT DOCUMENTS

| | | | |
|---|---|---|---|
| CN | 104354860 A | * | 2/2015 |
| CN | 204279936 U | | 4/2015 |
| CN | 106417244 A | | 2/2017 |
| CN | 108995799 A | | 12/2018 |
| CN | 209251514 U | | 8/2019 |
| CN | 111213631 A | * | 6/2020 |
| CN | 113044206 A | * | 6/2021 |
| EP | 1 329 159 A1 | | 7/2003 |
| JP | 2003-250427 A | | 9/2003 |
| JP | 2004-135525 A | | 5/2004 |
| JP | 3199308 U | | 8/2015 |
| JP | 2019-047755 A | | 3/2019 |
| JP | 2019062743 A | * | 4/2019 |
| WO | 2010/023253 A1 | | 3/2010 |
| WO | 2019/094765 A1 | | 5/2019 |

\* cited by examiner

WILDLIFE WARNING SYSTEM FOR AERIAL VEHICLE

This application is a National Stage of International Application No. PCT/JP2019/040501 filed Oct. 15, 2019.

TECHNICAL FIELD

The present invention relates to an aerial vehicle.

BACKGROUND ART

In a conventionally known technique, aerial vehicles are used to scare birds and animals. For example, Patent Document 1 discloses such a technique. Patent Document 1 discloses a drone having loudspeakers attached to its body to output sound for scaring birds and animals.

Patent Document 1: Japanese Unexamined Patent Application, Publication No. 2019-62743

DISCLOSURE OF THE INVENTION

Problems to be Solved by the Invention

In the aerial vehicle disclosed in Patent Document 1, continuous supply of electric power is required for at least the output of sound from the loudspeakers. To save the consumption of electric power for outputting sound, the prior art has room for improvement.

An object of the present invention, which has been made under these circumstances, is to provide an aerial vehicle capable of outputting sound for scaring birds and animals with reduced power consumption.

Means for Solving the Problems

An aspect of the present invention is directed to an aerial vehicle including: at least one air flow generator configured to generate an air flow for lifting; and at least one sound producing structure having an opening and configured to produce sound when the air flow causes air to flow into the opening.

Effects of the Invention

The present invention makes it possible to provide an aerial vehicle capable of outputting sound for scaring birds and animals with reduced power consumption.

PREFERRED MODS FOR CARRYING OUT THE INVENTION

Hereinafter, non-limiting exemplary embodiments of the present invention will be described with reference to the drawings.

An aerial vehicle according to an embodiment may be a drone, which is capable of flying in an unmanned manner. The term "capable of flying in an unmanned manner" means the ability to fly with no human pilot on board and is intended to cover not only autonomous flying vehicles but also human remote-controlled unmanned flying vehicles.

Figure 1:
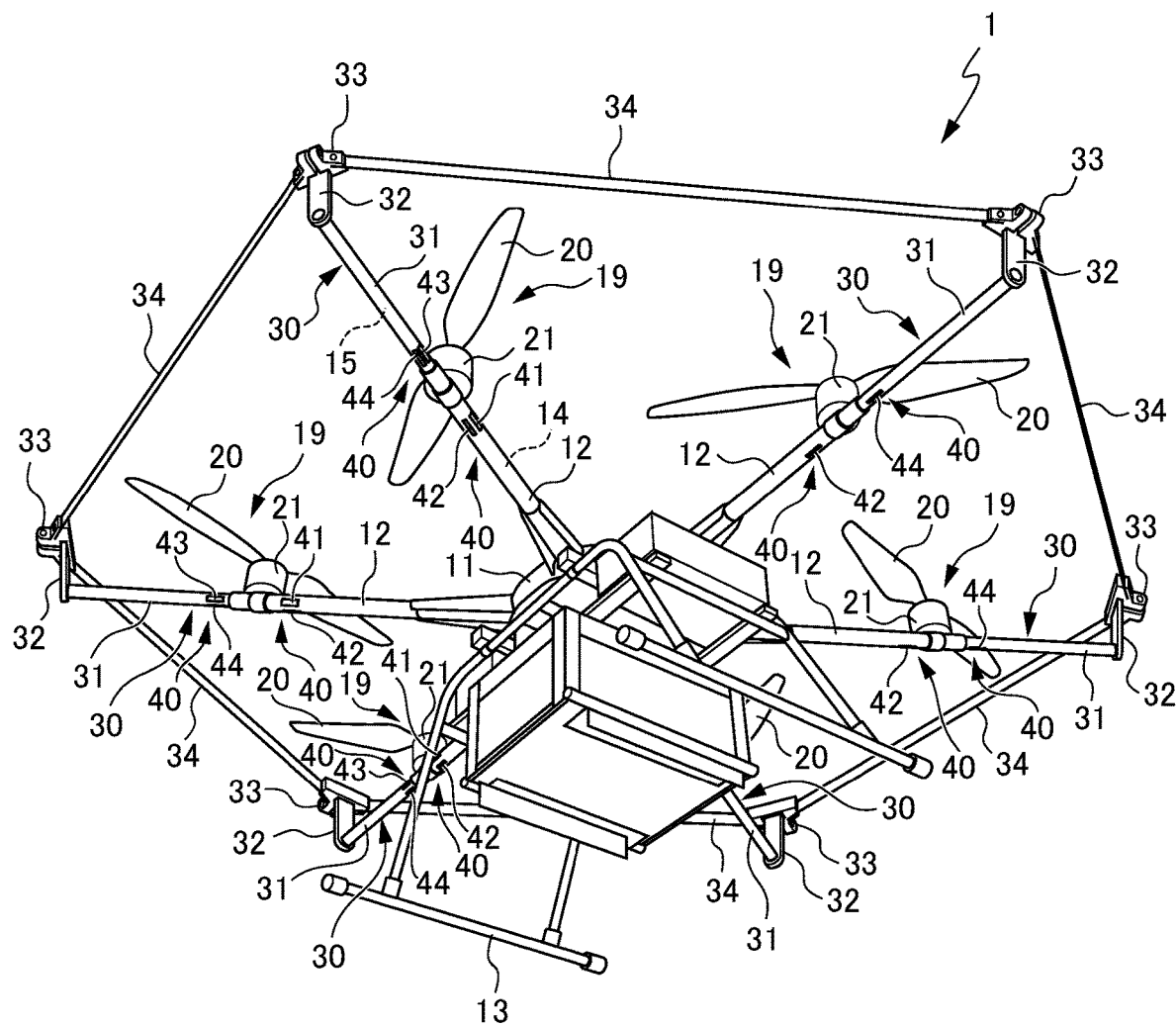
FIG. 1 is a perspective view from obliquely below of an aerial vehicle according to a first embodiment of the present invention.

An aerial vehicle 1 according to a first embodiment of the present invention will be described. FIG. 1 is a perspective view from obliquely below of the aerial vehicle 1.

As shown in FIG. 1, the aerial vehicle 1 includes a main body 11; arms 12 extending from the main body 11; air flow generators 19 each configured to generate an air flow for allowing the aerial vehicle 1 to fly; guards 30 that protect the air flow generators 19; and sound producing structures 10 each configured to produce sound for scaring birds and animals.

The main body 11 is located at a center of the aerial vehicle 1 in plan view. A leg 13 for landing on a landing surface is disposed at a lower part of the main body 11. In addition, the main body 11 is equipped with a controller 100 configured to control the aerial vehicle 1 in various ways as described later, a camera 102, and other components.

The arm 12 is a support having one end connected to the main body 11 and the other end (hereinafter referred to as the "distal end") provided with the air flow generator 19. In this embodiment, six (plural) arms 12 extend radially (in radial directions) from the main body 11 in plan view. The six arms 12 are spaced at equal intervals along the circumferential direction in plan view.

The air flow generator 19 includes a rotor 20 and a rotor drive unit 21. The rotor drive unit 21 is disposed on a distal end side of the arm 12 and includes a built-n motor for rotating the rotor 20. As the rotor 20 rotates, an air flow is generated to produce a lift force that lifts the aerial vehicle 1 upward.

The guard 30 includes a guard extension 31 connected to the distal end of the arm 12; a guard support 32 extending upward from the distal end of the guard extension 31; and a protector 34 supported by the guard support 32.

The guard extension 31 horizontally extends radially outward from the arm 12. In this context, the term "outside" indicates a side away from the main body 11 in plan view with respect to the center of gravity or the center of the main body 11 in the aerial vehicle 1, which may be alternatively expressed as "radially outside" with respect to the center of a sphere.

The guard support 32 extends substantially parallel to the axis of rotation of the rotor 20 from the distal end of the guard extension 31. The guard extension 32 and the rotor 20 are disposed at positions where the rotor 20 is kept from contact with the guard support 32 even when the rotor 20 rotates. The guard support 32 is provided with a guard fastener 33 for fixing the protector 34.

The protectors 34 are strip-shaped members annularly disposed as a whole to surround the main body 11 in plan view. The protectors 34 are flexible and extend over to form connections between the six guard supports 32. Specifically, in plan view, the six (plural) protectors 34 form a hexagon (polygon), and all of the plural rotors 20 are located inside the hexagon. In this embodiment, the protectors 34 are positioned at substantially the same level as the rotors 20 in the vertical direction in order to protect the rotors 20 from other flying vehicles, buildings, and so on.

The sound producing structure 40 is configured to produce sound for scaring a target. Examples of the target include birds and animals, such as birds responsible for bird strikes at airports and mammals including wild boars causing damage to crops in agricultural fields. In this embodiment, the sound producing structure 40 is provided at each of the six arms 12 and the six guard extensions 31. That is, the aerial vehicle 1 has twelve sound producing structures 40 in total.

Figure 2:
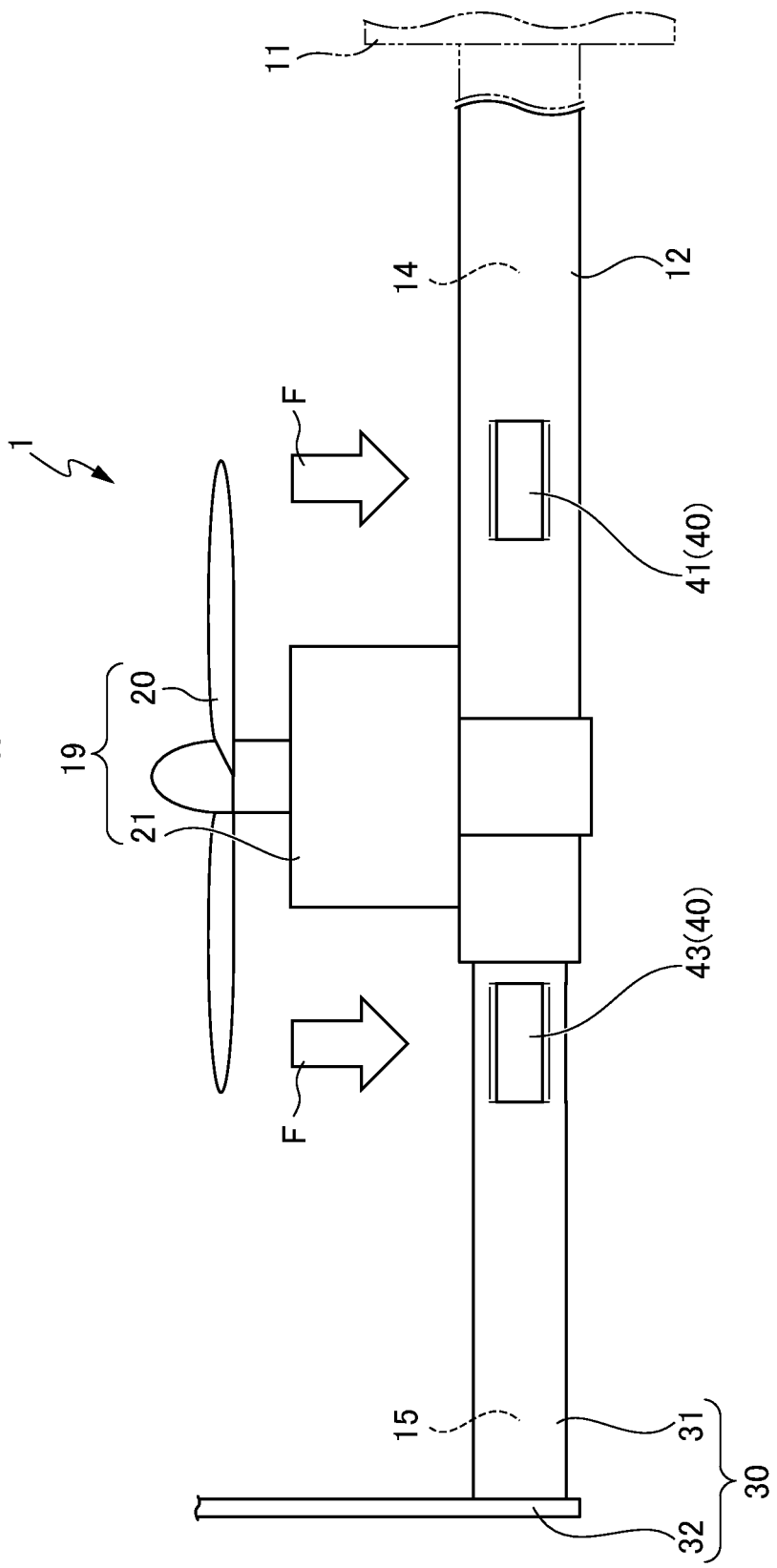
FIG. 2 is a side view of an area at and around a rotor of the aerial vehicle according to the first embodiment of the present invention.
Figure 3:
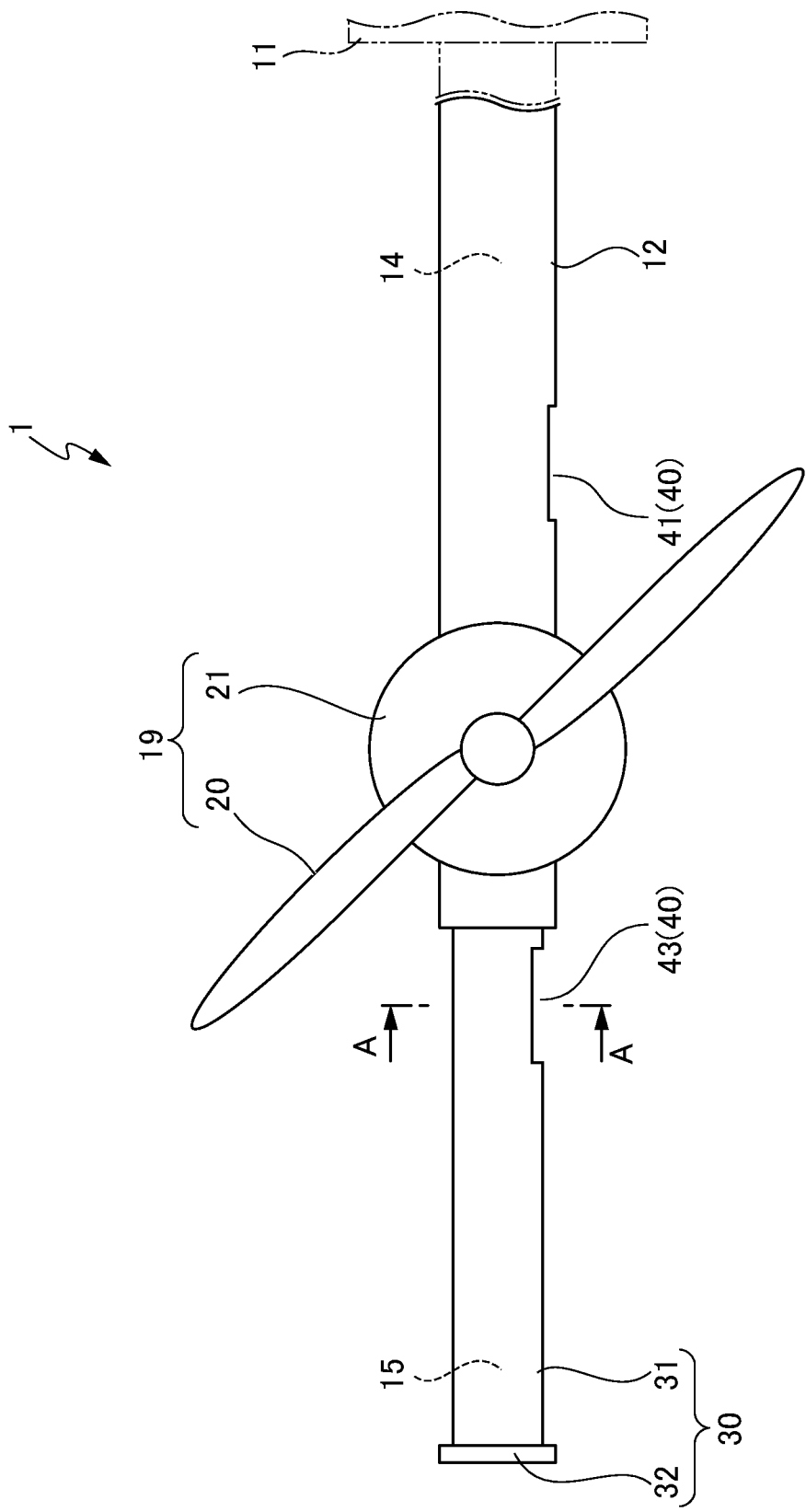
FIG. 3 is a plan view of the area at and around a rotor of the aerial vehicle according to the first embodiment of the present invention.
Figure 4:
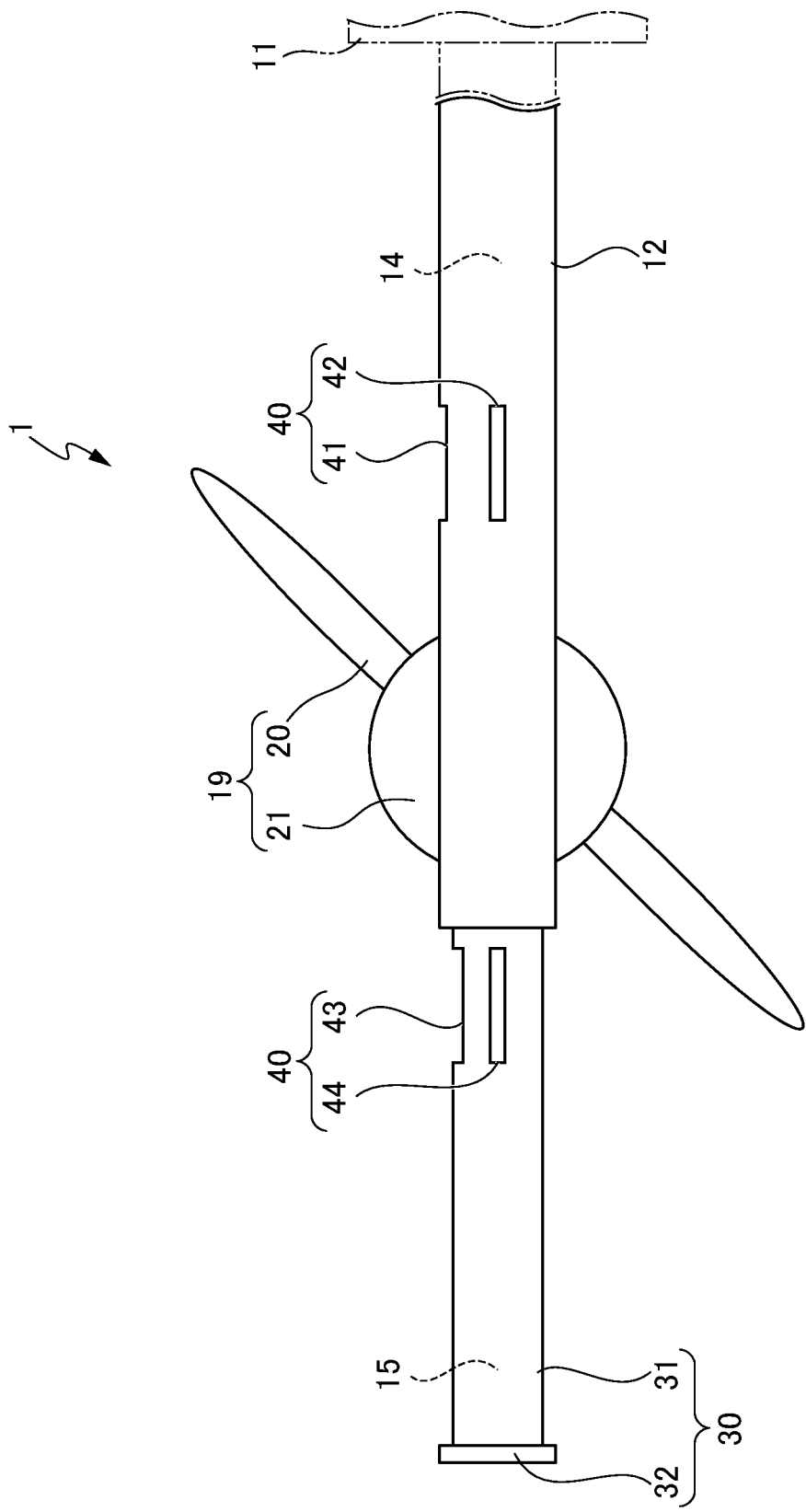
FIG. 4 is a bottom view of the area at and around a rotor of the aerial vehicle according to the first embodiment of the present invention.
Figure 5:
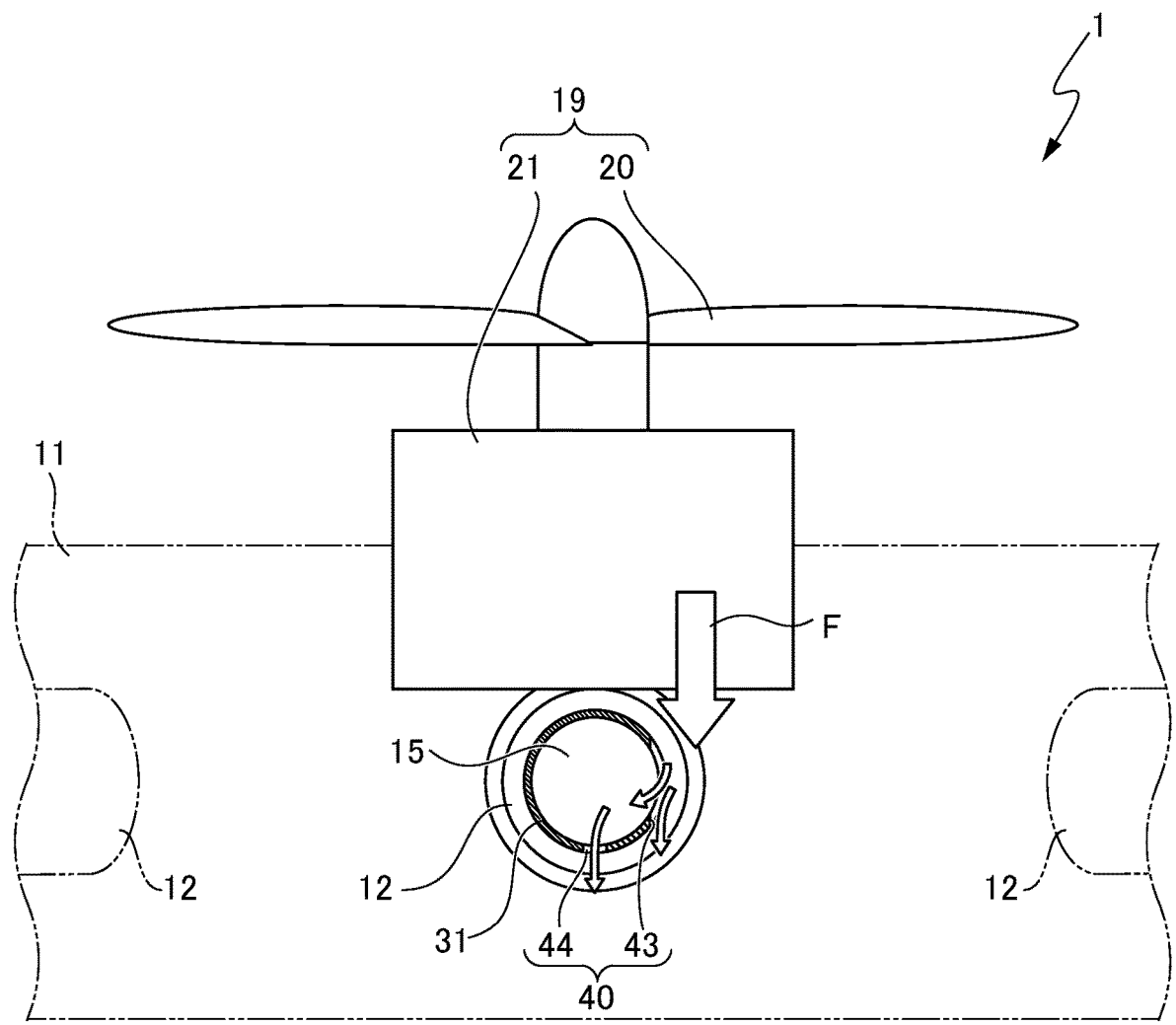
FIG. 5 is a cross-sectional view of the area at and around a rotor of the aerial vehicle according to the first embodiment of the present invention.

The features of the sound producing structure 40 will be described. FIG. 2 is an enlarged side view of an area at and around the rotor 20 of the aerial vehicle 1. FIG. 3 is an enlarged plan view of the area at and around the rotor 20 of the aerial vehicle 1, FIG. 4 is an enlarged bottom view of the area at and around the rotor 20 of the aerial vehicle 1, and FIG. 5 is a cross-sectional view along line A-A in FIG. 3. It should be rioted that the guard fastener 33 and the protector 34 are not shown in FIGS. 2 to 5.

The sound producing structure 40 provided on the arm 12 side includes an opening 41 and a flow outlet 42, which are formed in the arm 12. The opening 41 and the flow outlet 42 formed are ail located inside the trajectory of rotation of the rotor 20 when viewed in the direction of the rotational axis of the rotor 20.

In this embodiment, the arm 12 is in the form of a tube having an inner hollow 14. The opening 41 communicates with the hollow 14 of the arm 12. As shown in FIGS. 2 and 3, the opening 41 is provided at one place in the side of each arm 12. In this embodiment, the opening 41 has a substantially rectangular shape in side view. It will be understood that the opening 41 may have any shape such as a circular shape, an elliptical shape, or a non-rectangular polygonal shape. In the example shown in FIGS. 4 and 5, the upper and lower edges of the opening 41 are located at the same position in plan view, which is non-limiting. Alternatively, for example, in plan view, the opening 41 may have a lower edge located outside its upper edge in a direction perpendicular to the longitudinal direction of the arm 12. When the opening 41 has a lower edge protruding more than its upper edge in this way, more air can be allowed to flow in through the opening 41.

The flow outlet 42 is an opening communicating with the hollow 14 of the arm 12. As shown in FIG. 4, the flow outlet 42 is provided at one place in the bottom of each arm 12. In this embodiment, the flow outlet 42 has a substantially rectangular shape in bottom view. It will be understood that the flow outlet 42 may have any shape such as a circular shape, an elliptical shape, or a non-rectangular polygonal shape.

The sound producing structure 40 provided on the guard extension 31 side includes an opening 43 and a flow outlet 44, which are formed in the guard extension 31. The opening 43 and the flow outlet 44 formed in the sound generating structure 40 are located inside the trajectory of rotation of the rotor 20 when viewed in the direction of the rotational axis of the rotor 20.

In this embodiment, the guard extension 31 is in the form of a tube having an inner hollow 15. The opening 43 communicates with the hollow 15 of the guard extension 31. As shown in FIGS. 2 and 3, the opening 43 is provided at one place in the side of each guard extension 31. In this embodiment, the opening 43 has a substantially rectangular shape in side view. It will be understood that the opening 43 may have any shape such as a circular shape, an elliptical shape, or a non-rectangular polygonal shape. In the example shown in FIGS. 4 and 5, the upper and lower edges of the opening 43 are located at the same position in plan view, which is non-limiting. Alternatively, for example, plan view, the opening 43 may have a lower edge located outside its upper edge in a direction perpendicular to the longitudinal direction of the guard extension 31. When the opening 43 has a lower edge protruding more than its upper edge in this way, more air can be allowed to flow in through the opening 43.

The flow outlet 44 is an opening communicating with the hollow 15 of the guard extension 31. As shown in FIG. 4, the flow outlet 44 is provided at one place in the bottom of each guard extension 31. In this embodiment, the flow outlet 44 has a substantially rectangular shape in bottom view. It will be understood that the flow outlet 44 may have any shape such as a circular shape, an elliptical shape, or a non-rectangular polygonal shape.

As indicated by the arrow F in FIG. 5, as the rotor 20 rotates, an air flow is generated, and the air flows downward from the rotor 20. As a result, the air is blown from above to the arm 12 and the guard extension 31 of the guard 30.

It will be described how the sound producing structure 40 provided in the guard extension 31 produces sound. The sound producing structure 40 produces sound by bending the air flow. Specifically, the air flow generated when the rotor 20 rotates allows the air to be blown to the opening 43. When blown to the opening 43, the air collides with the edge of the opening 43 to produce separate air flows, an air flow going to the hollow 15 of the guard extension 31 and an air flow going to outside the guard extension 31. The air flow is disturbed in the vicinity of the edge of the opening 43 to cause air resonance in the hollow 15, so that sound is produced at a specific frequency depending on the shape of the hollow 15 of the guard extension 31. In this process, after flowing through the hollow 15 of the guard extension 31, the air flows out of the guard extension 31 through the flow outlet 44.

The sound producing structure 40 provided in the arm 12 also produces sound in a similar way to the guard extension 31. When blown to the opening 41, the air collides with the edge of the opening 41 to produce separate air flows, an air flow going to the hollow 14 of the arm 12 and an air flow going to outside the arm 12. The air flow is disturbed in the vicinity of the edge of the opening 41 to cause air resonance in the hollow 14, so that sound is produced at a specific frequency depending on the shape of the hollow 14 of the arm 12. After flowing through the hollow 14 of the arm 12, the air flows out of the arm 12 through the flow outlet 42.

As described above, by using the air flow generated when the aerial vehicle 1 flies, the sound producing structure 40 produces sound without consuming electric power, and the sound can be used to scare birds and animals. Further in this embodiment, the arm 12 and the sound producing structure 40 are integrated together, and the arm 12 has the hollow 14, which makes it possible to reduce the total weight of the aerial vehicle 1. Similarly, the guard extension 31 and the sound producing structure 40 are integrated together, and the guard extension 31 has the hollow 15, which makes it possible to reduce the weight of the guard 30.

The hollow 14 of the arm 12 may be so shaped as to produce sound with a frequency that can repel birds and animals, which are targets to be scared. Similarly, the hollow 15 of the guard extension 31 may be so shaped as to produce sound with a frequency that can repel birds and animals, which are targets to be scared. The sound producing structure 40 provided on the arm 12 side and the sound producing structure 40 provided on the guard extension 31 side may produce sounds with the same frequency or sounds with different frequencies. In addition, the sound producing structures 40 in the arms 12 may produce sounds with the same frequency or sounds with different frequencies. The sound producing structures 40 in the guard extensions 31 may also produce sounds with the same frequency or sounds with different frequencies.

When the plural sound producing structures 40 are all configured to produce sounds with the same frequency, a larger volume of sound can be produced at the frequency. On the other hand, when the plural sound producing structures 40 are configured to produce sounds with different frequencies, the scaring effect can be enhanced for different types of birds or animals, which are different in repellent frequency. For example, the twelve sound producing structures 40 may be configured to produce sounds with different frequencies so that twelve scaring sounds with different frequencies can be produced, which is effective in scaring more types of birds and animals.

Figure 6:
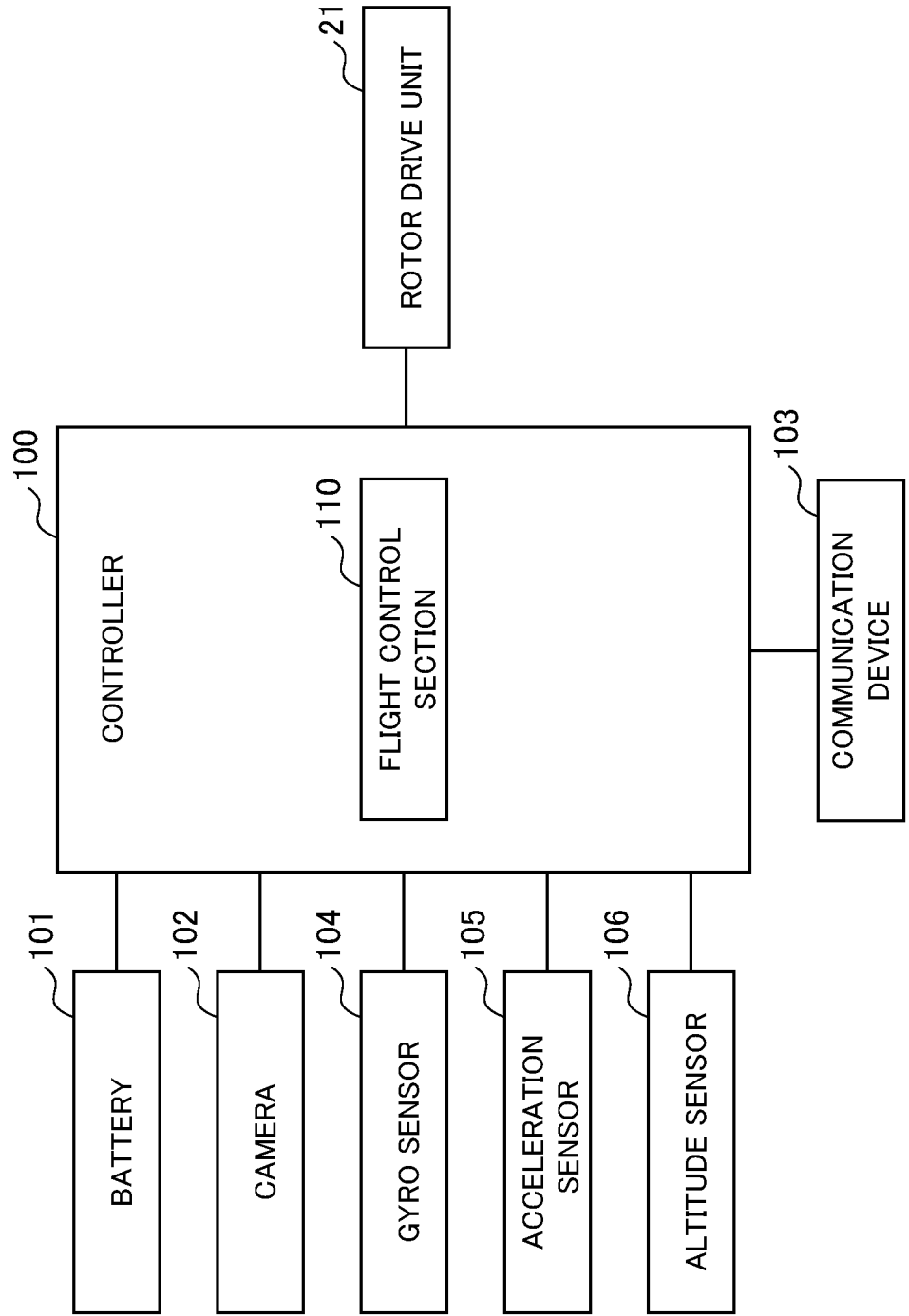
FIG. 6 is a block diagram showing an electrical configuration of a controller of the aerial vehicle according to the first embodiment of the present invention.

Next, the controller 100 will be described. FIG. 6 is a block diagram showing an electrical configuration of the controller 100 in the aerial vehicle 1.

The controller 100 is, for example, a computer including a CPU, a memory, and other components and configured to execute control programs for executing various control processes including flight operations of the aerial vehicle 1. The controller 100 is electrically connected to: a power supply device such as a battery 101; a detector such as a camera 102; a communication device 103 that transmits and receives signals to and from an external device such as an operation controller or GPS; and various electronic devices such as a gyro sensor 104, an acceleration sensor 105, and an altitude sensor 106.

As shown in FIG. 6, the controller 100 includes a flight control section 110 configured to control the flight of the aerial vehicle 1. The flight control section 110 is implemented by some of the programs stored in the controller 100.

The flight control section 110 controls the flight of the aerial vehicle 1 based on various types of information from the camera 102, the communication device 103, the gyro sensor 104, the acceleration sensor 105, the altitude sensor 106, and so on. The flight control section 110 adjusts the number of rotations of the rotor 20 and so on by controlling the movement of the rotor drive unit 21. As the flight control section 110 increases the number of rotations of the rotor 20, a more powerful air flow is generated to allow the sound producing structure 40 to produce a larger volume of sound.

Next, the flight control by the flight control section 110 in the controller 100 will be described by way of example.

When the camera 102 of the aerial vehicle 1 detects a predetermined target, the controller 100 may perform control to start chasing a bird or animal, which is a target to be scared.

The controller 100 makes a comparison between an image captured by the camera 102 and information that is stored in the controller 100 to identify the target and then determines whether the target is detected in the image captured by the camera 102. When the target is detected based on the image captured by the camera 102, the flight control section 110 may start chasing until the target goes away from a predetermined area.

The controller 100 may also control the flight of the aerial vehicle 1 based on information received by the communication device 103 as well as information captured by the camera 102.

For example, the controller 100 may control the flight of the aerial vehicle 1 based on information from a ground system configured to detect targets entering a predetermined area in a farm, an airport, or the like. More specifically, when receiving a signal indicating the detection of a target from the ground system through the communication device 103, the aerial vehicle 1 may be controlled to circulate in a target area monitored by the ground system. As a result, the aerial vehicle 1 circulates only when the ground system detects the target, which makes it possible to save the electric power consumed by the aerial vehicle 1 for monitoring and driving away birds and animals. In addition, the aerial vehicle 1 can monitor the target in cooperation with the ground system, so that it can more reliably drive away the target entering the predetermined area by means of scaring sound from the sound producing structure 40.

The flight control section 110 of the controller 100 may also control the flight based on information input to an external operation controller.

Figure 7:
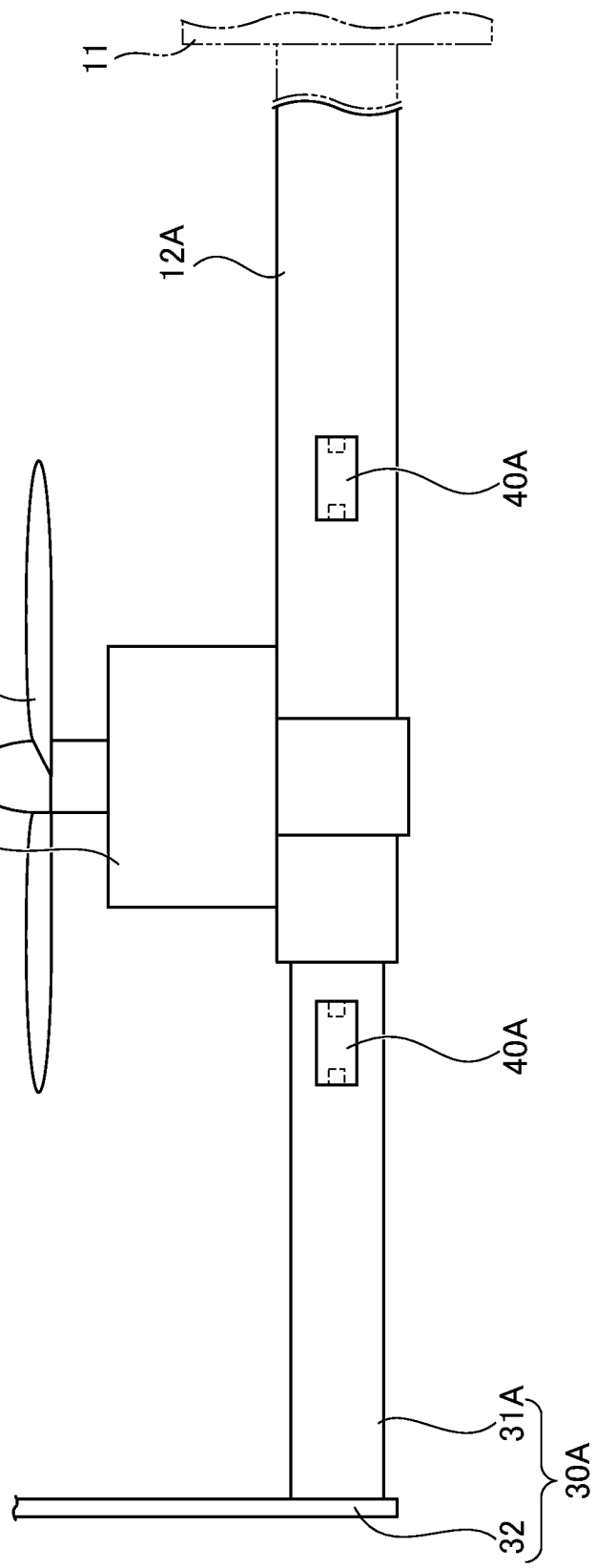
FIG. 7 is a side view of an area at and around a rotor of an aerial vehicle according to a second embodiment of the present invention.

Next, an aerial vehicle 1A according to a second embodiment of the present invention will be described with reference to FIGS. 7 to 10. FIG. 7 is an enlarged side view of an area at and around a rotor 20 of the aerial vehicle 1A, FIG. 8 is an enlarged plan view of the area at and around the rotor

Figure 8:
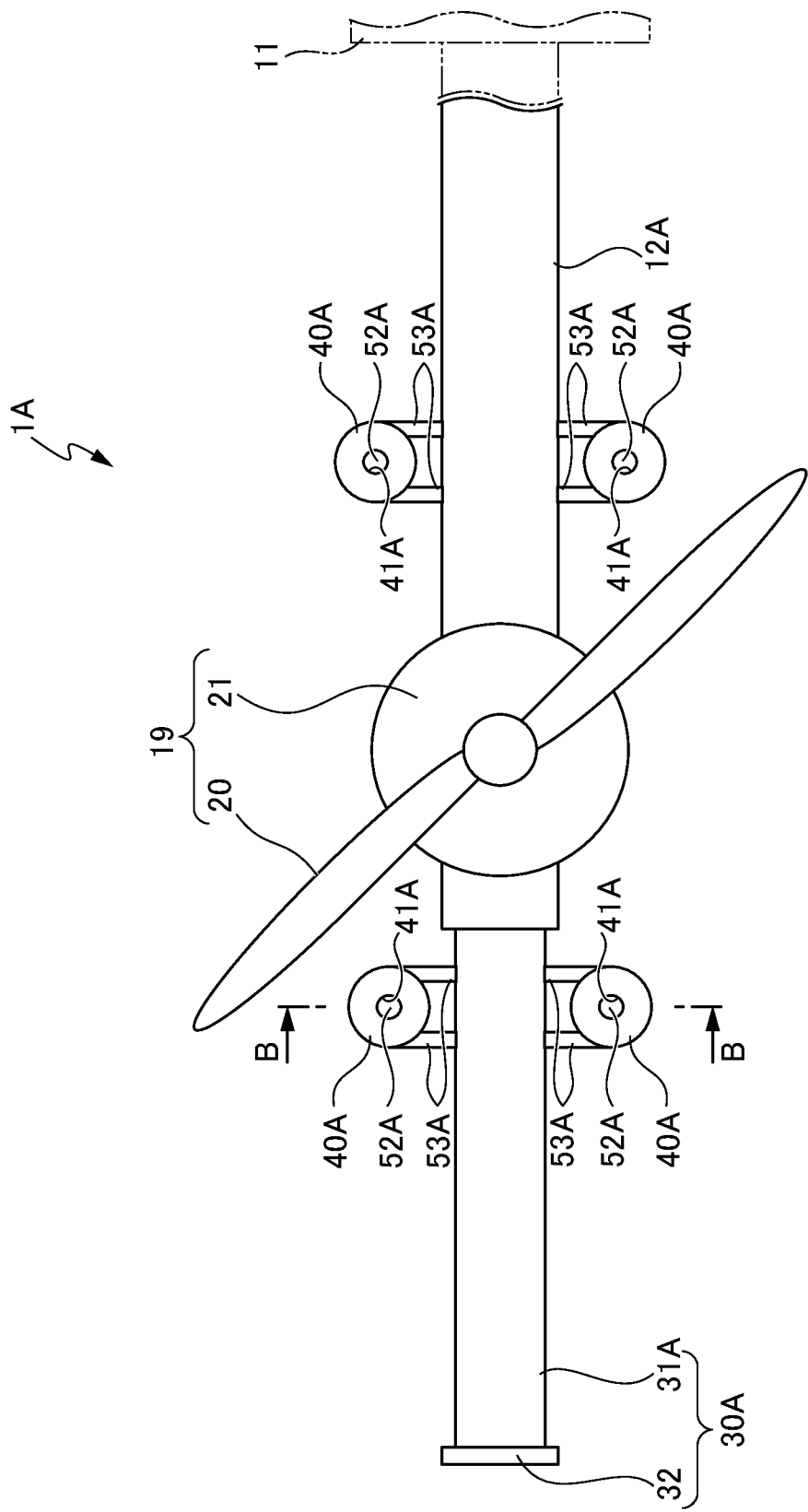
FIG. 8 is a plan view of the area at and around a rotor of the aerial vehicle according to the second embodiment of the present invention.
Figure 9:
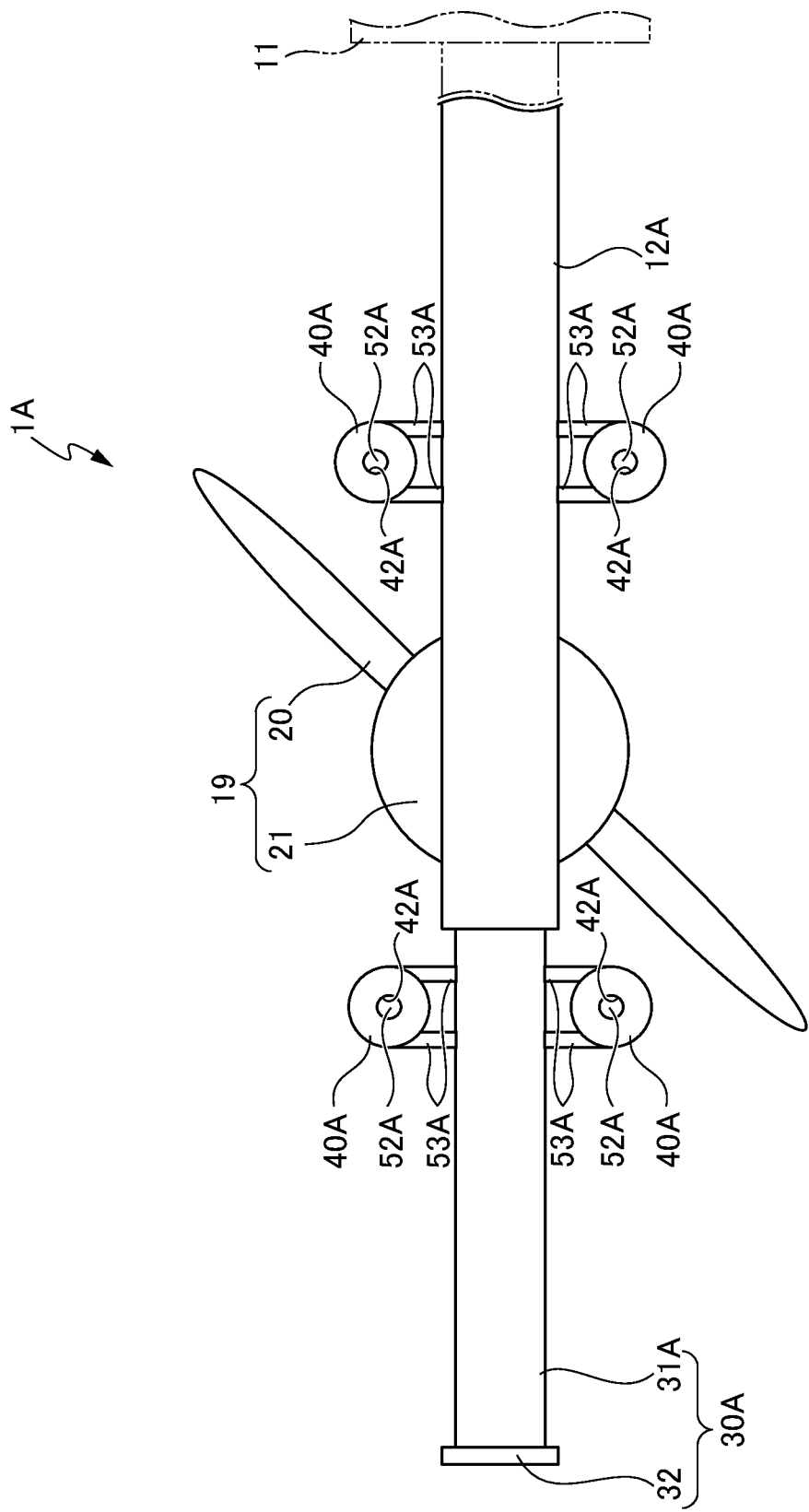
FIG. 9 is a bottom view of the area at and around a rotor of the aerial vehicle according to the second embodiment of the present invention.
Figure 10:
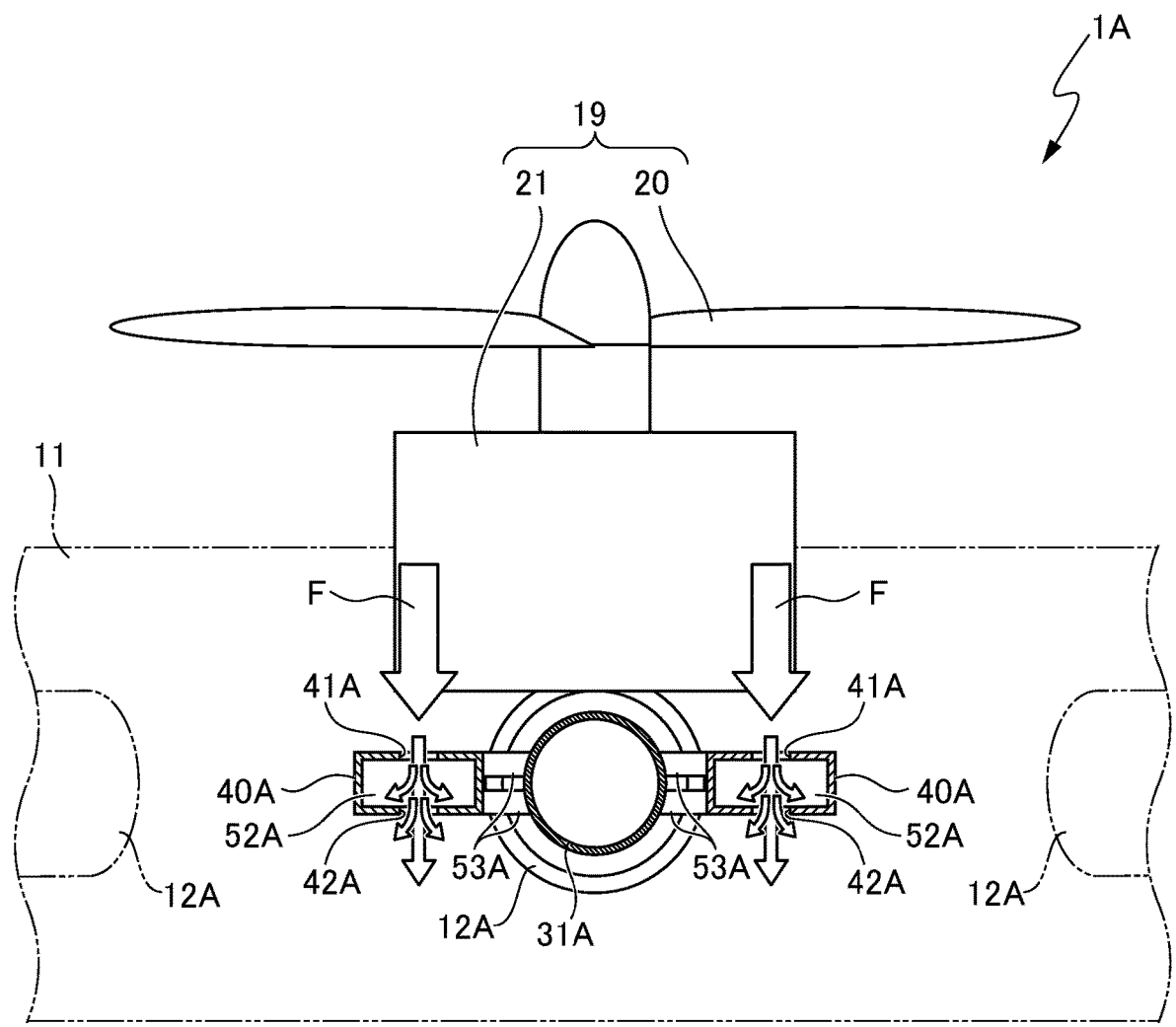
FIG. 10 is a cross-sectional view of the area at and around a rotor of the aerial vehicle according to the second embodiment of the present invention.

20 of the aerial vehicle 1A, FIG. 9 is an enlarged bottom view of the area at and around the aerial vehicle 1A, and FIG. 10 is a cross-sectional view along line B-B in FIG. 8. It should be noted that the guard fastener 33 and the protector 34 are not shown. In addition, the same components as those in the aerial vehicle 1 according to the first embodiment may be denoted by the same reference signs, and repeated description thereof may be omitted.

The aerial vehicle 1A includes a main body 11; arms 12A extending from the main body 11; air flow generators 19 each configured to generate an air flow for allowing the aerial vehicle 1A to fly; guards 30A that protect the air flow generators 19; and sound producing structures 40A each configured to produce sound for scaring birds and animals.

The aerial vehicle 1A differs from the aerial vehicle 1 according to the first embodiment in that the arm 12A and a guard extension 31A of the guard 30A neither have openings 41 and 43 nor flow outlets 42 and 44.

As shown in FIGS. 6 to 9, the sound producing structure 40A is attached to a side of each of the arm 12A and the guard extension 31A with a fastener 53A. More specifically, the sound producing structures 40A are provided on circumferentially both sides in plan view with the arm 12A in between them. The sound producing structures 10A are also provided on circumferentially both sides in plan view with the guard extension 31A in between them. In this embodiment, the sound producing structure 40A is attached to each of the six arms 12A and the six guard extensions 31A. That is, the aerial vehicle 1A has 24 sound producing structures 40A in total.

The sound producing structure 40A is an annular member having an inner hollow 52A through which air can pass. The sound producing structure 40A has an opening 41A formed in its upper side and a flow outlet 42A formed in its lower side. The opening 41A and the flow outlet 42A are both substantially circular in plan view, and communicate with the hollow 52A. As shown in FIG. 10, the opening 41A and the flow outlet 42A are positioned to overlap each other in plan view. In addition, the opening 41A and the flow outlet 42A formed are located inside the trajectory of rotation of the rotor 20 in plan view.

As shown in FIG. 10, the sound producing structure 40A receives, at the opening 41A, an air flow generated when the rotor 20 rotates, and allows the air from the opening 41A to flow through the hollow 52*a* and to flow out through the flow outlet 42A. The air flow continuously produces vortexes in the hollow 52A, which cause air vibrations to produce sound. According to the features of this embodiment, the air flow generated when the aerial vehicle 1A flies can also be used to produce sound with reduced consumption of electric power.

Further, in the second embodiment, the opening 41A of the sound producing structure 40A is provided at a position below the rotor 20 and facing the rotor 20, which allows more air to easily flow from the opening 41A into the hollow 52A. This allows the sound producing structure 40A to produce a larger volume of sound more easily.

Further, in the second embodiment, the sound producing structure 40A is attached to the arm 12A or the guard extension 31A with the fastener 53A, which makes it easy to replace the sound producing structure 40A with one with a different frequency.

In addition, the plural sound producing structures 40 in the aerial vehicle 1A may produce sounds with the same frequency or sounds with different frequencies.

Figure 11:
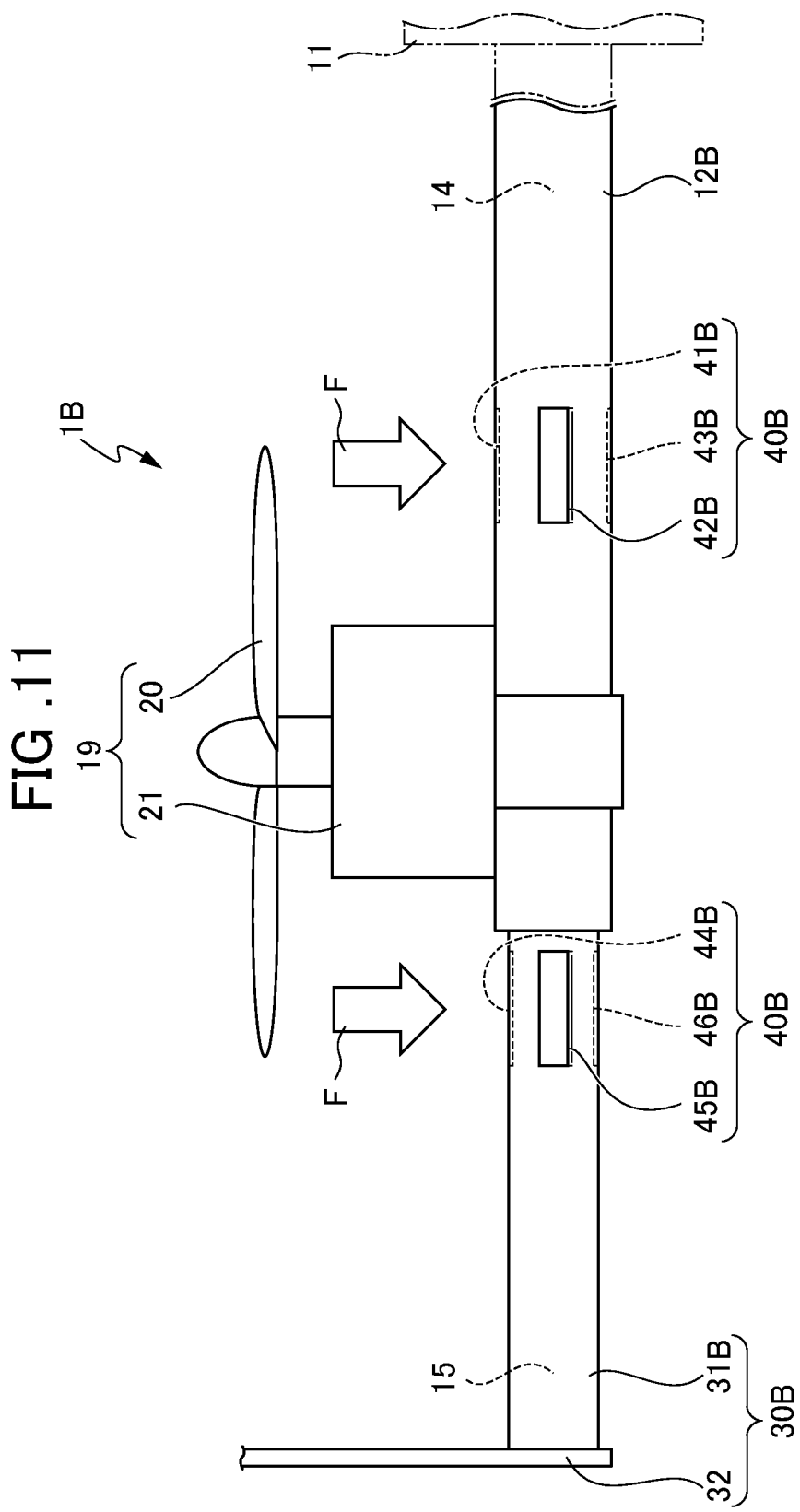
FIG. 11 is a side view of an area at and around a rotor of an aerial vehicle according to a third embodiment of the present invention.
Figure 12:
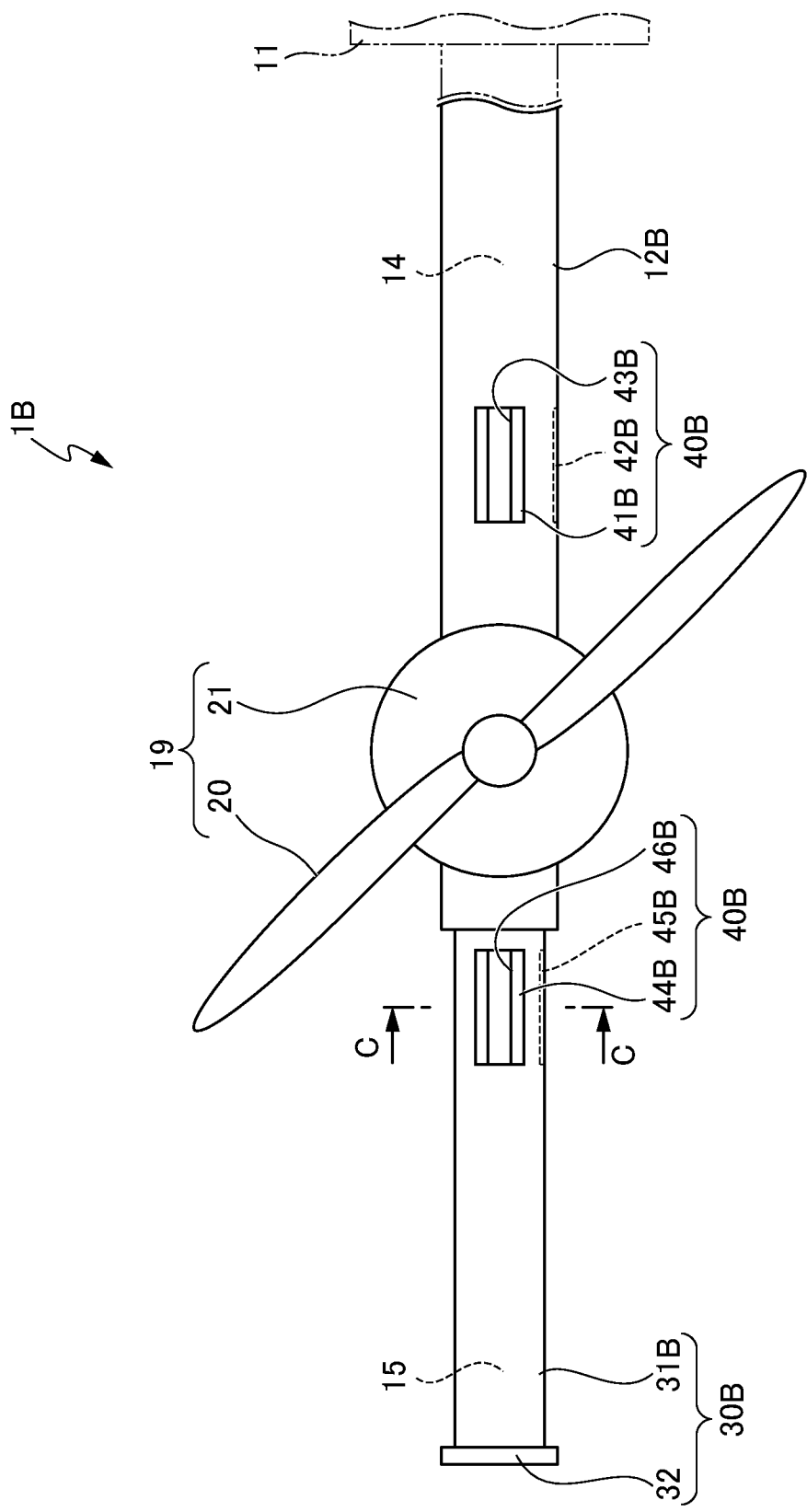
FIG. 12 is a plan view of the area at and around a rotor of the aerial vehicle according to the third embodiment of the present invention.
Figure 13:
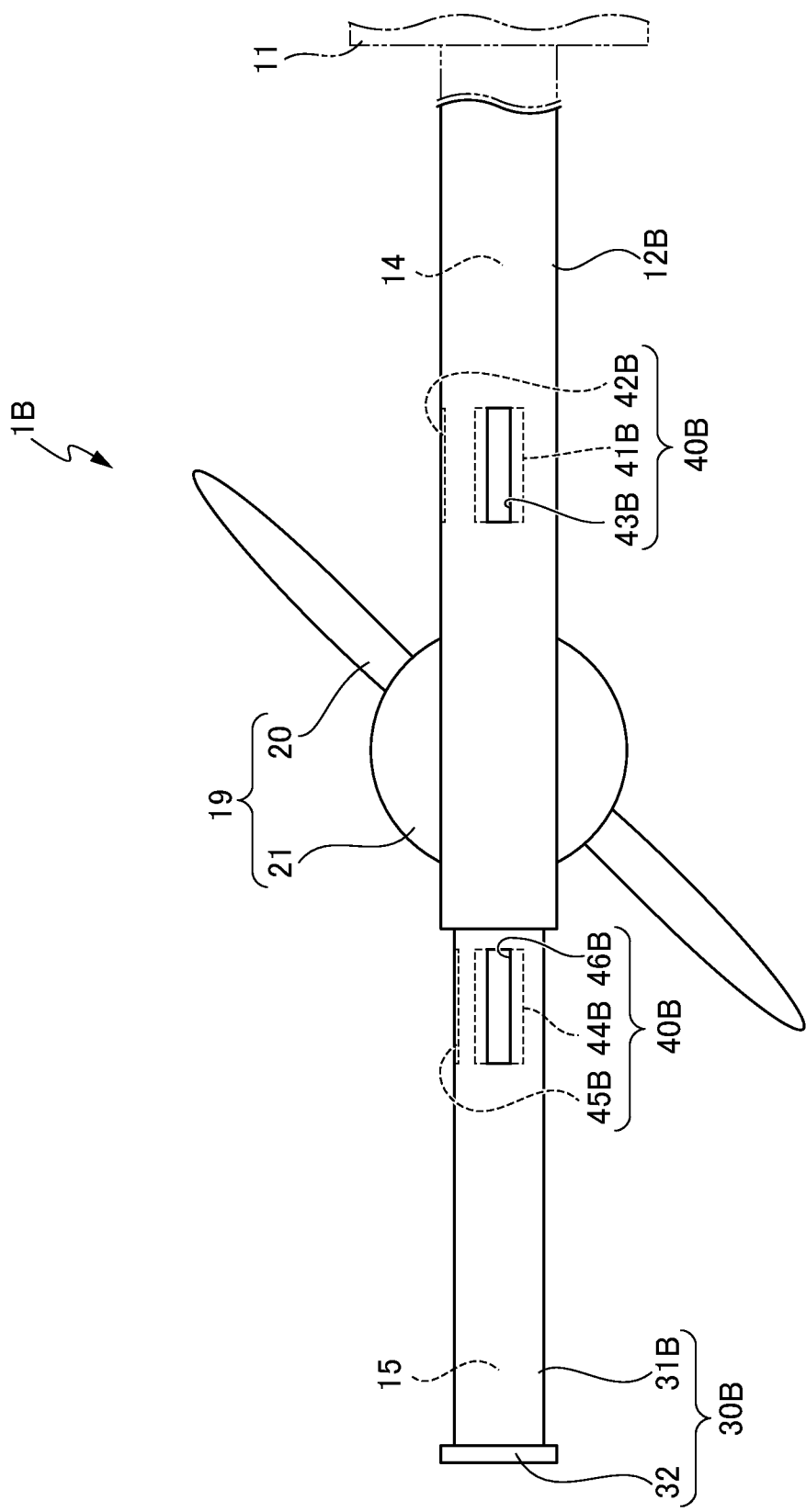
FIG. 13 is a bottom view of the area at and around a rotor of the aerial vehicle according to the third embodiment of the present invention.
Figure 14:
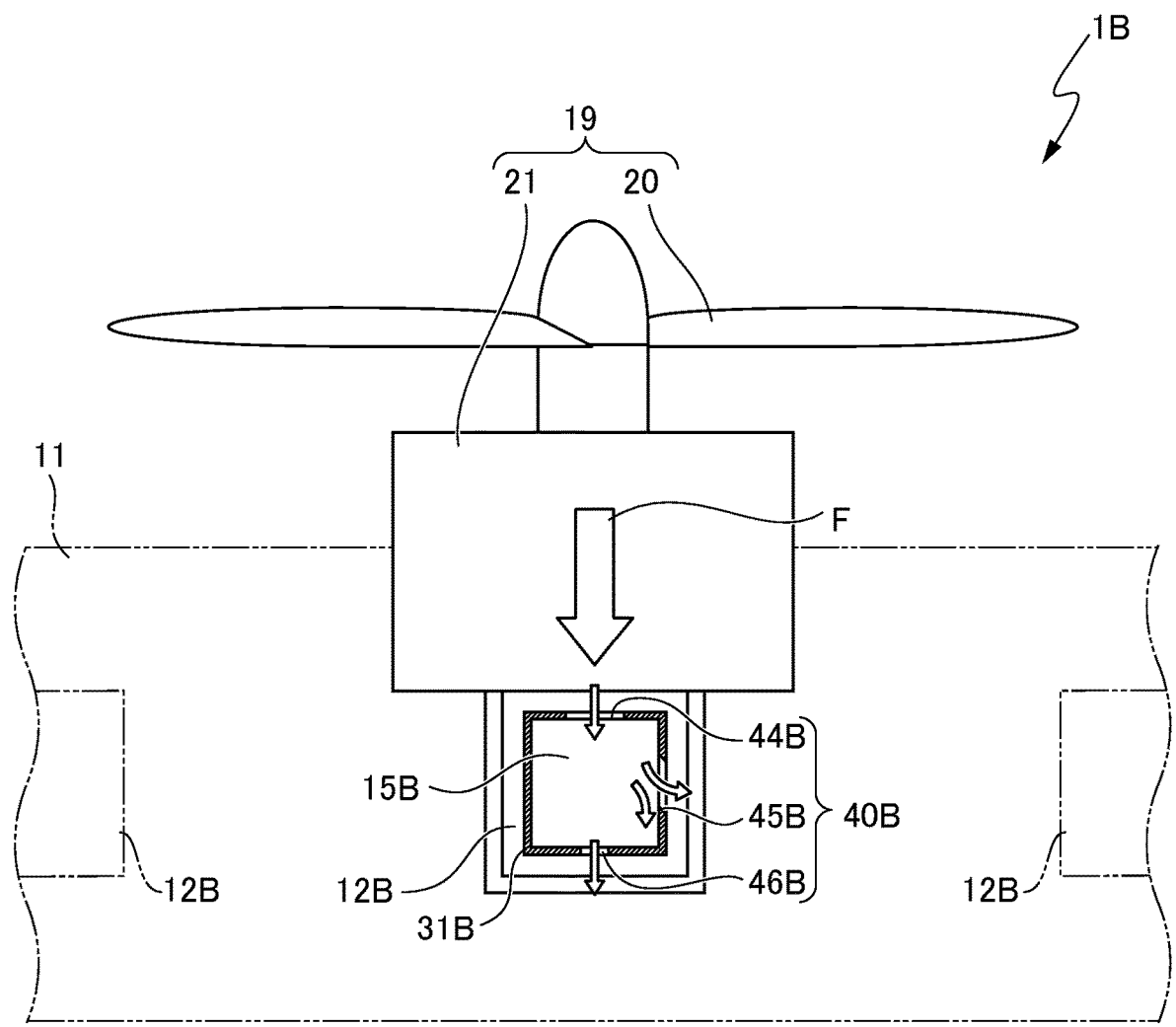
FIG. 14 is a cross-sectional view of the area at and around a rotor of the aerial vehicle according to the third embodiment of the present invention.

Next, an aerial vehicle 1B according to a third embodiment of the present invention will be described with reference to FIGS. 11 to 14. FIG. 11 is an enlarged side view of an area at and around a rotor 20 of the aerial vehicle 1B, FIG. 12 is an enlarged plan view of the area at and around the rotor 20 of the aerial vehicle 1B, FIG. 13 is an enlarged bottom view of the area at and around the aerial vehicle 1B, and FIG. 14 is a cross-sectional view along line C-C in FIG. 11. It should be noted that the guard fastener 33 and the protector 34 are not shown in FIGS. 11 to 14. In addition, the same components as those in the aerial vehicle 1 according to the first embodiment may be denoted by the same reference signs, and repeated description thereof may be omitted.

The aerial vehicle 1B includes a main body 11; arms 12B extending from the main body 11; air flow generators 19 each configured to generate an air flow for allowing the aerial vehicle 1 to fly; guards 30B that protect the air flow generators 19; and sound producing structures 40B each configured to produce sound for scaring birds and animals.

In this embodiment, the sound producing structure 40B is provided at each of the six arms 12B and the six guard extensions 31B. That is, the aerial vehicle 1B has twelve sound producing structures 40B in total.

The sound producing structure 40B provided on the arm 12B side includes an opening 411B and flow outlets 421B and 43B, which are formed in the arm 12B. The opening 41B and the flow outlets 42B and 43B formed are all located inside the trajectory of rotation of the rotor 20 when viewed in the direction of the rotational axis of the rotor 20.

In this embodiment, the arm 12B is in the form of a tube having an inner hollow 14B. The arm 12B has a substantially rectangular shape in vertical cross-sectional view. The opening 41B communicates with the hollow 14B of the arm 12B. As shown in FIG. 12, the opening 41B is provided at one place in the upper side of each arm 12B. In this embodiment, the opening 41B has a substantially rectangular shape in plan view. It will be understood that the opening 41B may have any shape such as a circular shape, an elliptical shape, or a non-rectangular polygonal shape.

The flow outlet 42B is an opening communicating with the hollow 14B of the arm 12B. As shown in FIG. 11, the flow outlet 42B is provided at one place in the side of each arm 12B. In this embodiment, the flow outlet 42B has a substantially rectangular shape in side view. It will be understood that the flow outlet 42B may have any shape such as a circular shape, an elliptical shape, or a non-rectangular polygonal shape.

The flow outlet 43B is an opening communicating with the hollow 14B of the arm 12B. As shown in FIG. 13, the flow outlet. 43B is provided at one place in the bottom of each arm 12B. In this embodiment, the flow outlet. 43B has a substantially rectangular shape in bottom view. It will be understood that the flow outlet 43B may have any shape such as a circular shape, an elliptical shape, or a non-rectangular polygonal shape. In addition, the flow outlet 43B has an opening area smaller than that of the opening 41B.

The sound producing structure 40B provided on the guard extension. 31B side includes an opening 44B and flow outlets 45B and 46B, which are formed in the guard extension 31B. The opening 44B and the flow outlets 45B and 46B formed in the sound producing structure 40B are located inside the trajectory of rotation of the rotor 20 when viewed in the direction of the rotational axis of the rotor 20.

In this embodiment, the guard extension 31B is in the form of a tube having an inner hollow 15B. The guard extension 31B has a substantially rectangular shape in vertical cross-sectional view. The opening 44B communicates with the hollow 15B of the guard extension 31B. As shown in FIG. 12, the opening 44B is provided at one place in the upper side of each guard extension 31B. In this embodiment, the opening 44B has a substantially rectangular shape in plan view. It will be understood that the opening 44B may have any shape such as a circular shape, an elliptical shape, or a non-rectangular polygonal shape.

The flow outlet 45B is an opening communicating with the hollow 15B of the guard extension 31B. As shown in FIG. 11, the flow outlet 45B is provided at one place in the side of each guard extension 31B. In this embodiment, the flow outlet 45B has a substantially rectangular shape in side view. It will be understood that the flow outlet 45B may have any shape such as a circular shape, an elliptical shape, or a non-rectangular polygonal shape.

The flow outlet 46B is an opening communicating with the hollow 15B of the guard extension 31B. As shown in FIG. 13, the flow cutlet 46B is provided at one place in the bottom of each guard extension 31B. In this embodiment, the flow outlet 46B has a substantially rectangular shape in bottom view. It will be understood that the flow outlet 46B may have any shape such as a circular shape, an elliptical shape, or a non-rectangular polygonal shape. In addition, the flow outlet. 46B has an opening area smaller than that of the opening 44B.

As indicated by the arrow F in FIG. 14, as the rotor 20 rotates, an air flow is generated, and the air flows downward from the rotor 20. As a result, the air is blown from above to the arm 12B and the guard extension 31B of the guard 30B.

It will be described how the sound producing structure 40E provided in the guard extension 31B produces sound. The air flow generated when the rotor 20 rotates allows the air to be blown to the opening 44E. When blown to the opening 44B, the air collides with the edge of the opening 44B and flows into the hollow 15E while producing a turbulent air flow. The air flow entering the hollow 15R produces, in the hollow 15B, separate air flows, an air flow going out of the flow owlet 45B and an air flow going out of the flow outlet 46B. The air flows cause air resonance in the hollow 15E, so that sound is produced at a specific frequency depending on the shape of the hollow 15E of the guard extension 31B.

The sound producing structure 40B provided in the arm 12B also produces sound in a similar way to the guard extension 31B. The air flow generated when the rotor 20 rotates allows the air to be blown to the opening 41B. When blown to the opening 41B, the air collides with the edge of the opening 41B and flows into the hollow 14E while producing a turbulent air flow. The flow entering the hollow 14B produces, in the hollow 14E, separate air flows, an air flow going out of the flow outlet 42B and an air flow going out of the flow outlet 43B. The air flows cause air resonance in the hollow 14B, so that sound is produced at a specific frequency depending on the shape of the hollow 14B of the guard extension 31B. According to the features of this embodiment, the air flow generated when the aerial vehicle 1B flies can also be used to produce sound with reduced consumption of electric power.

Further in this embodiment, the arm 12B and the sound producing structure 40B are integrated together, and the arm 12B has the hollow 14B, which makes it possible to reduce the total weight of the aerial vehicle 1B the guard extension 31B and the sound producing structure 40B are integrated together, and the guard extension 31B has the hollow 15B, which makes it possible to reduce the weight of the guard 30B.

Further, in this embodiment, the openings 41B and 44B of the sound producing structure 40B are provided at positions below the rotor 20 and facing the rotor 20, which allows more air to easily flow from the openings 41B and 44B into the hollows 14B and 15B. This allows the sound producing structure 40B to produce a larger volume of sound more easily.

In addition, the plural sound producing structures 40B in the aerial vehicle 1B may produce sounds with the same frequency or sounds with different frequencies.

Figure 15:
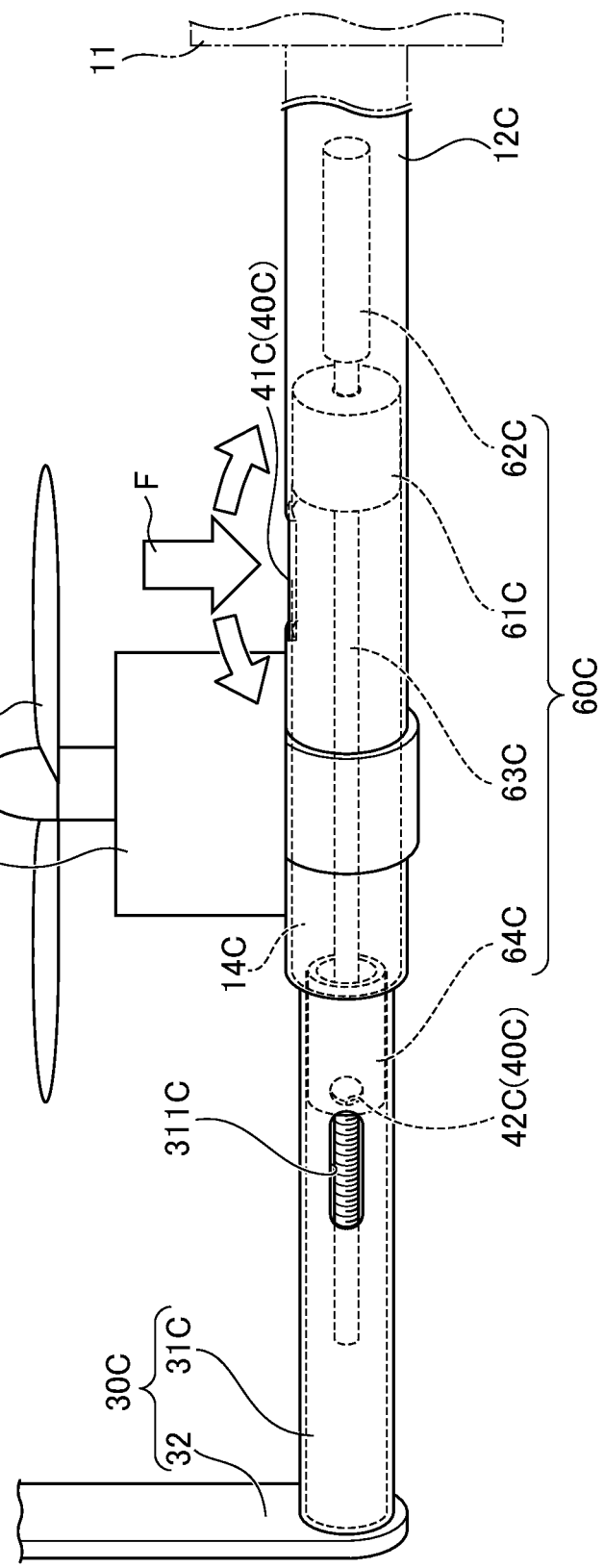
FIG. 15 is a side view showing how a plugging system in an aerial vehicle according to a fourth embodiment of the present invention suppresses the output of sound.
Figure 16:
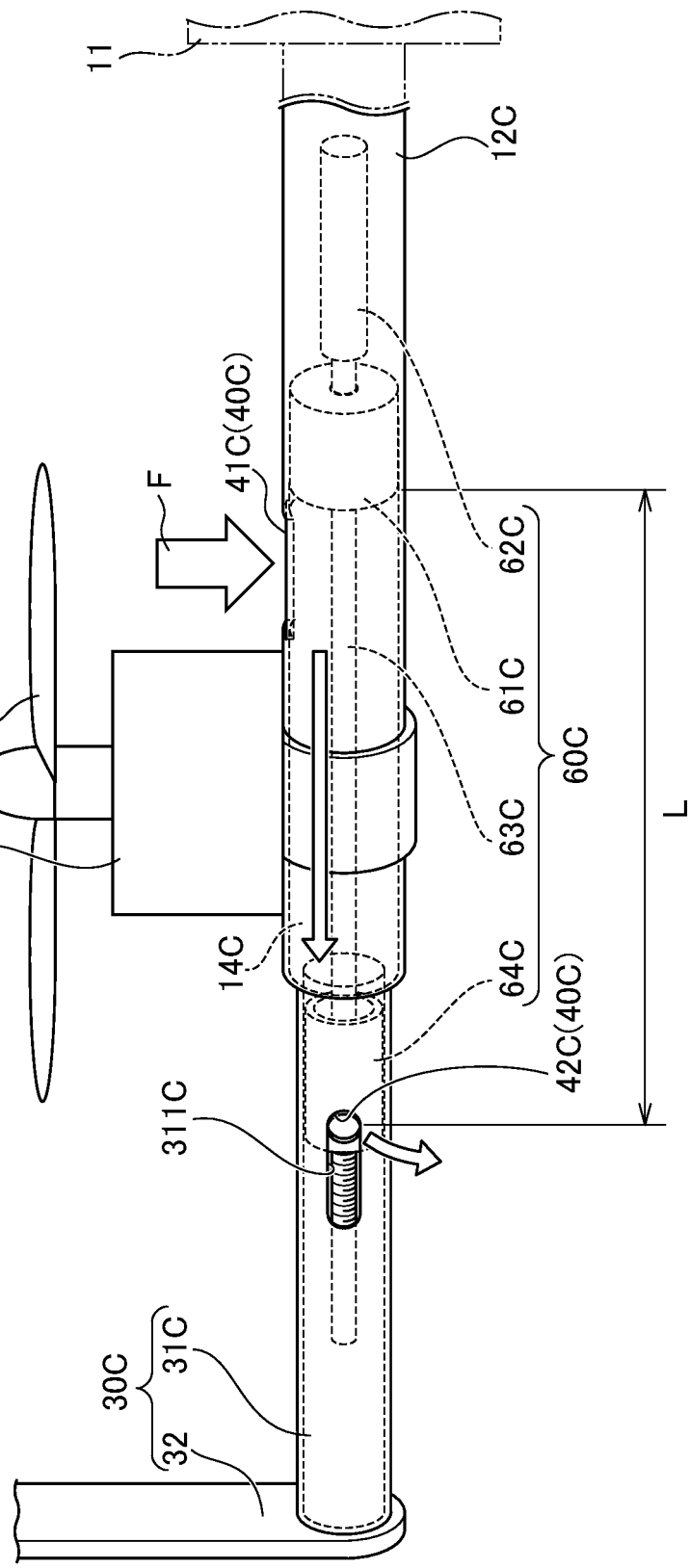
FIG. 16 is a side view showing how a frequency changing system in the aerial vehicle according to the fourth embodiment of the present invention produces the highest frequency sound.
Figure 17:
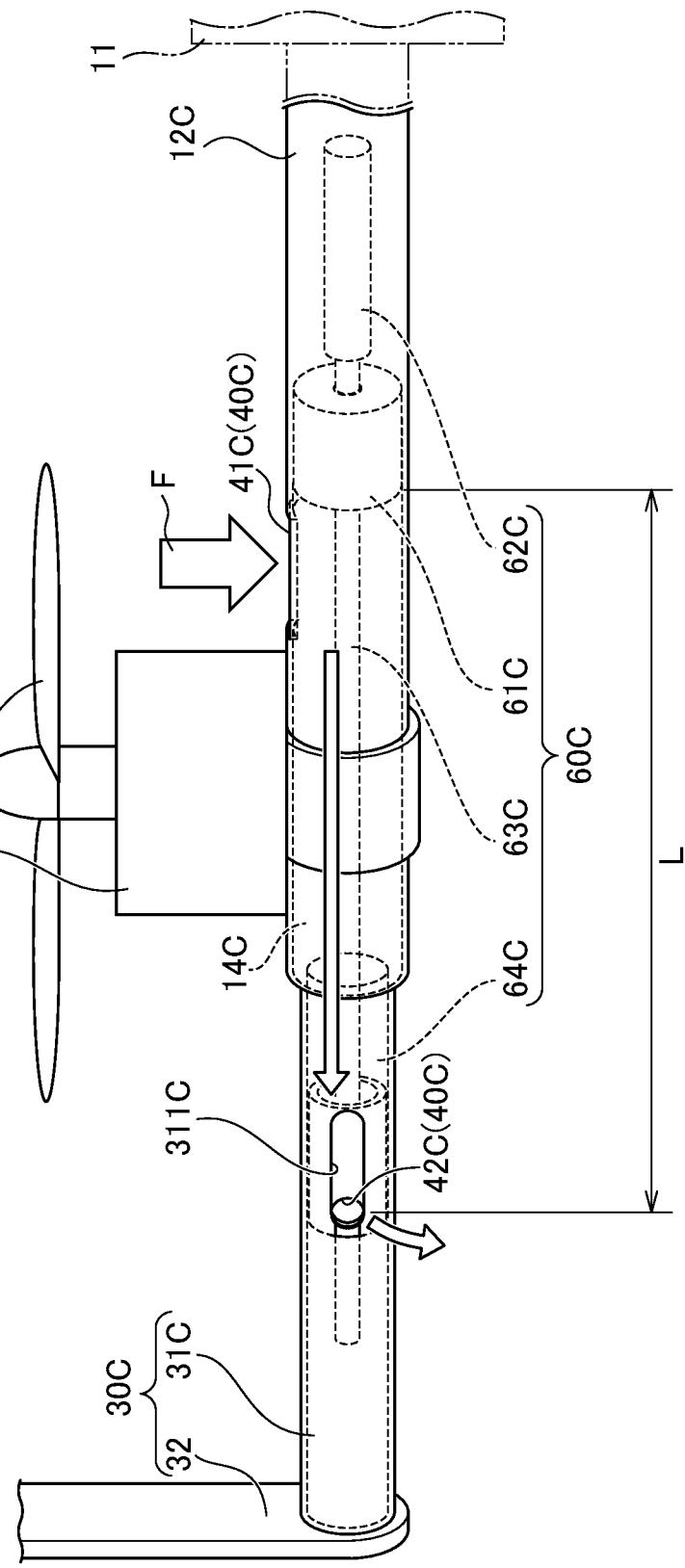
FIG. 17 is a side view showing how the frequency changing system in the aerial vehicle according to the fourth embodiment of the present invention produces the lowest frequency sound.

Next, an aerial vehicle 1C according to a fourth embodiment of the present invention will be described with reference to FIGS. 15 to 17. FIG. 15 is a side view showing how a frequency changing system. 60C also serving as a plugging system in the aerial vehicle 1C suppresses the output of sound. FIG. 16 is a side view showing how the frequency changing system 60C in the aerial vehicle 1C produces high frequency sound. FIG. 17 is a side view showing how the frequency changing system 60C in the aerial vehicle 1C produces low frequency sound. It should be noted that the same components as those in the aerial vehicle 1 according to the first embodiment may be denoted by the same reference signs, and repeated description thereof may be omitted.

The aerial vehicle 1C includes a main body 11; arms 12C extending from the main body 11; air flow generators 19 each configured to generate an air flow for allowing the aerial vehicle 1 to fly; guards 30C that protect the air flow generators 19; sound producing structures 40C each configured to produce sound for scaring birds and animals; and frequency changing systems 60C each configured to change a frequency from the sound producing structure 40C.

The arm 12C is a tubular support having one end connected to the main body 11 and the distal end provided with the air flow generator 19. The arm 12C has an opening 41C at an upper side. In this embodiment, six (plural) arms 12C extend radially (in radial directions) from the main body 11 in plan view. The six arms 12C are spaced at equal intervals along the circumferential direction in plan view.

The guard extension 31C is in the form of a tube extending horizontally and radially outward from the arm 12C. The arm 12C and the guard extension 31C have inner spaces communicating with each other. The guard extension 31C has a slit 311C in a side. The slit 311C extends in a horizontal direction and has a substantially elliptical shape. The slit 311C is an opening communicating with the inner space of the guard extension 31C.

As shown in FIG. 16, a partition 61C, an actuator 62C, a shaft 63C, and a cylinder 64C are provided in the interiors of the arm 12C and the guard extension 31C.

The partition 61C is a cylindrical member having both ends closed and having a central axis parallel to the axial direction of the arm 12C. The partition 61C is disposed with its outer circumferential surface in contact with the inner circumferential surface of the arm 12C. The partition 61C is disposed at a position shifted from the opening 41C toward the main body 11 in the axial direction of the arm 12C. The partition 61C shuts down communication between the main body 11-side space in the arm 12C and the guard extension 31C-side space.

The actuator 62C is a drive unit provided between the main body 11 and the partition 61C to slide the cylinder 64C. The actuator 62C and the cylinder 64C are connected via a rod-shaped shaft 63C.

The cylinder 64C is a cylindrical member with a central axis parallel to the axial directions of the arm 12C and the guard extension 31C. The cylinder 64C is disposed to be slidable in the axial direction. The cylinder 64C has a closed end on the guard extension side. The cylinder 64C is disposed with its outer circumferential surface in contact with the inner circumferential surfaces of the arm 12C and the guard extension 31C. The space formed between the guard extension 31C-side end of the partition. 61C and the closed end of the cylinder 64C is referred to as a hollow 14C among the spaces inside the arm 12C and the guard extension 31C.

Next, the features of the sound producing structure 40C will be described with reference to FIG. 16. The sound producing structure 40C includes an opening 41C formed in the arm 12C, and a flow outlet 42C formed in the cylinder 64C. In the present embodiment, the sound producing structure 40C is provided for each of six combinations of the arm 12C and the cylinder 64C. That is, the aerial vehicle 10 has six sound producing structures 40 in total.

The opening 41C communicates with the hollow 14C. The opening 41C is formed so as to be located inside the trajectory of rotation of the rotor 20 in plan view. As shown in FIG. 16, the opening 41C is provided at one place in the upper side of each arm 12C. In this embodiment, the opening 41C has a substantially rectangular shape in plan view will be understood that the opening 41C may have any shape such as a circular shape, an elliptical shape, or a non-rectangular polygonal shape.

The flow outlet 42C is an opening communicating with the hollow 14C on the guard extension 31C side. As shown in FIG. 16, the flow outlet 42C is provided at one place in the outer circumferential side of the cylinder 64C. More specifically, the flow outlet 42C is provided at one of both ends of the cylinder 64C in the vicinity of the slit 311C of the guard extension 31C. The flow outlet 42C is provided at the same level as the slit 311C in the vertical direction. When the cylinder 64C is in the position shown in FIG. 16, the flow outlet 42C overlaps the slit 311C in side view, so that the hollow 14C communicates with the outside through the flow outlet 42C. In this embodiment, the flow outlet 42C has a substantially circular shape in side view. It will be understood that the flow outlet 42C may have any shape such as an elliptical shape or a polygonal shape.

As indicated by the arrow F in FIG. 16, as the rotor 20 rotates, an air flow is generated, and the air flows downward from the rotor. As a result, the air is blown from above to the arm 12C.

It will be described how the sound producing structure 40C produces sound. The air flow generated when the rotor 20 rotates allows the air to be blown to the opening 41C. When blown to the opening 41C, the air collides with the edge of the opening 41C so that the flow of vibrating air passing through the hollow 14C and going out of the flow outlet 42C produces sound with a specific frequency depending on the shape of the hollow 14C.

Next, the frequency changing system 60C will be described with reference to FIGS. 15 to 17. The frequency changing system 60C includes the partition 61C, the actuator 62C, the shaft 63C, and the cylinder 64C.

The frequency changing system 60C changes the shape of the hollow 14C to change the frequency of sound. As shown in FIG. 16, when the flow outlet 42C is located at the main body 11-side end of the slit 311C, the distance L between the flow outlet 42C and the guard support 32-side end of the partition 61C is the shortest. In this case, the sound producing structure 40C produces the highest frequency sound.

As the actuator 62C is driven, the cylinder 64C is slid to change the position of the flow outlet 42C in the extending direction of the guard extension 31C. As the cylinder 64C is moved from the position shown in FIG. 16 to a position where the flow outlet 42C is located at the guard support 32-side end of the slit 311C as shown in FIG. 17, the distance L increases so that the sound producing structure 40C produces lower frequency sound. In this way, the frequency changing system 60C changes the position of the flow outlet 40C relative to the slit 311C to change the distance L and thus to change the frequency of the sound from the sound producing structure 40C.

The frequency changing system 60C also functions as a plugging system capable of plugging the flow outlet 42C. AS shown in FIGS. 16 and 17, when the outlet 42C and the slit 311C overlap each other in side view, the hollow 14C communicates with the outside through the flow outlet 42C. On the other hand, as shown in FIG. 15, as the actuator 62C is driven to move the cylinder 64C to a position where the flow outlet 42C does not overlap the slit 311C, the flow outlet 42C is plugged by the inner circumferential surface of the guard extension 31C. When the flow outlet 42C is plugged, the flow of the air from the opening 41C into the hollow 14C is suppressed so that the output of sound is suppressed in this way, switching is accomplished between the state in which the sound producing structure 40C produces sound and the state in which the output of sound is suppressed, which makes it possible to output bird/animal scaring sound at any desired time and to reduce the occurrence of noise pollution.

Figure 18:
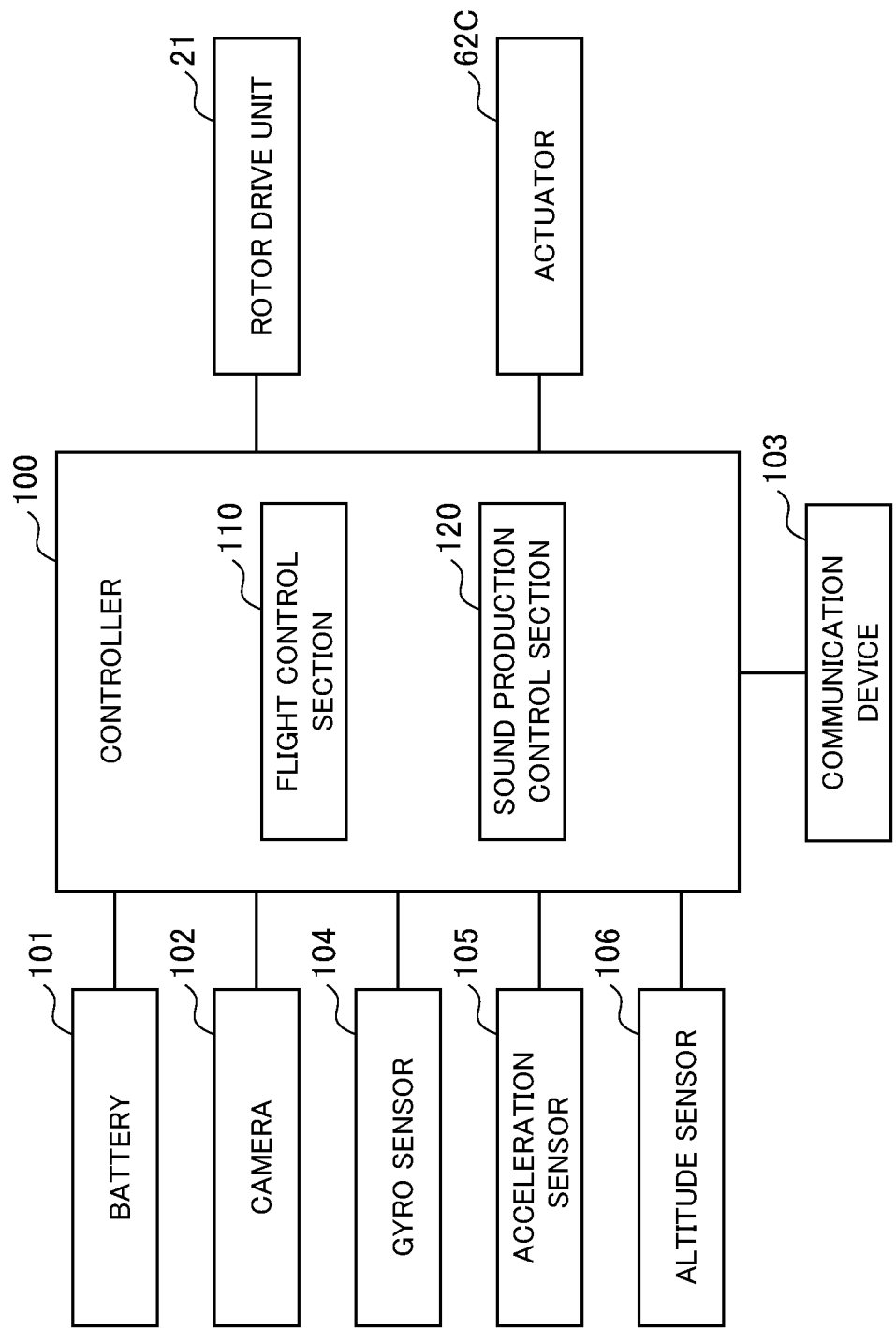
FIG. 18 is a block diagram showing an electrical configuration of a controller of the aerial vehicle according to the fourth embodiment of the present invention.

Next, the controller 100C will be described. FIG. 18 is a block diagram showing an electrical configuration of the controller 100C in the aerial vehicle 1C.

As shown in FIG. 18, the controller 1000 differs from the controller 100 according to the first embodiment in that it has a sound production control section 120 in addition to a flight control section 110 configured to control the flight of the aerial vehicle 1C.

The sound production control section 120 controls the driving of the actuator 62C in the frequency changing system 60C based on various types of information from the camera 102, the communication device 103, the altitude sensor 106, and so on. The sound production control section 120 may drive the actuator 62C to change the distance L for the hollow 14C and thus to change the frequency of the sound from the sound producing structure 40C. The sound production control section 120C may also drive the actuator 62C to plug the flow outlet 42C and thus to allow the frequency changing system 60C also serving as a plugging system to suppress the output of sound.

Next, examples of the control of the sound frequency and so on by the sound production control section 120C in the controller 100C will be described. In this case, the flight control section 110 of the controller 100$c$ may control the flight in a similar way to the flight control section 110 of the controller 100 according to the first embodiment.

When the camera 102 of the aerial vehicle 1C detects a predetermined target, the sound production control section 120C of the controller 100C may cause the frequency changing system 60C to change the sound frequency to one with a repellent effect on the target. More specifically, the sound production control section 120C may read out frequency information set for the target and recorded in the controller 100C and then drive the actuator 62C in the frequency changing system 60C to change the frequency to the desired frequency. The sound with the frequency set for the target has a repellent effect on the target. In this way, the sound with a frequency having a repellent effect on the target is produced to drive away the target more reliably.

In addition, when the camera 102 of the aerial vehicle 1C detects a predetermined target, the sound production control section 120C of the controller 100C may control the output of sound from the sound producing structure 40C. More specifically, when it is determined that the camera 102 has detected the target about which data is stored in the controller 1000, the sound production control section 120 may drive the actuator 62C to unplug the flow outlet 42C from the inner circumferential surface of the guard extension 31C and thus to output sound. In addition, when the distance between the detected target and the aerial vehicle 1C is longer than a predetermined distance, the sound production control section. 120 may drive the actuator 62C to move the cylinder 64C to a position in which the flow outlet 42C is plugged by the inner circumferential surface of the guard extension 31C. In other words, the sound production control section 120 may cause the flow outlet 42C to be plugged so that the output of sound is suppressed by hindering the inflow of the air from the opening 41C. On the other hand, when the distance between the detected target and the aerial vehicle 1C is shorter than a predetermined distance, the sound production control section 120 may cause the flow outlet 42C to be unplugged so that sound is output. In this way, the sound producing structure 40C can output sound only when the target comes close to a predetermined distance, which makes it possible to keep the occurrence of noise pollution to a minimum and to prevent the aerial vehicle 1C from coming into contact with a bird or animal.

In addition, the sound production control section 120 may control the output of sound from the sound producing structure 40C based on the flight altitude of the aerial vehicle 1, which is acquired through the communication device 103, which receives positional information from GPS or the like, the altitude sensor 106, or other devices. More specifically, when the flight altitude is lower than a predetermined altitude, the sound production control section 120 may cause the flow outlet 42C to be plugged so that the output of sound from the sound producing structure 40C is suppressed, and when flight altitude is higher than a predetermined altitude, the sound production control section 120 may cause the flow outlet 420 to be unplugged. As a result, the output of sound can be suppressed when the aerial vehicle 1 flies close to the ground, which makes it possible to prevent noise pollution in an environment where citizens live while birds and animals are driven away.

In addition, the sound production control section 120 of the controller 100C may control the frequency of sound and the output of sound based on information received by the communication device 103 as well as information captured by the camera 102.

For example, the controller 100C may control the output of sound based on information from a ground system that detects a monitoring target entering a predetermined area in a farm, an airport, or the like. More specifically, the sound production control section 120 may drive the actuator 62C to unplug the flow outlet 420 only when the aerial vehicle 10 is in a target area monitored by a ground system and receives, from the ground system, information instructing to start the output of sound. This makes it possible to reduce the occurrence of noise pollution and to prevent the aerial vehicle 1C from coming into contact with a bird or animal.

In addition, the sound production control section 120 of the controller 100C may control the frequency of sound and the output of sound based on information input to an external operation controller.

As is obvious from the above description, each embodiment of the present invention has features that bring about advantageous effects as described below.

An embodiment of the present invention is directed to an aerial vehicle (1, 1A, 1B, 1C) including: at least one air flow generator (19) configured to generate an air flow for lifting; and at least one sound producing structure (40, 40A, 40B, 40C) having an opening (41, 43, 41A, 41B, 44B, 41C) and configured to produce sound when it receives the air flow to cause air to flow into the opening (41, 43, 41A, 41B, 44B, 41C). According to this embodiment, the air flow generated when the aerial vehicle (1, 1A, 1B, 1C) flies is used to produce sound, so that the sound can be used to scare birds and animals with reduced power consumption.

An embodiment of the present invention is directed to an aerial vehicle (1, 1A, 1B, 1C) having plural rotors (20) and plural sound producing structures (40, 40A, 40B, 40C), in which the sound producing structures (40, 40A, 40B, 40C) are disposed at positions corresponding to the positions of the rotors (20). According to this embodiment, sounds are output from the plural sound producing structures (40, 40A, 40B, 40C), which provides a larger volume of sound for scaring birds and animals.

An embodiment of the present invention is directed to an aerial vehicle (1, 1A, 1B, 1C) having at least two sound producing structures (40, 40A, 40B, 40C) configured to produce sounds with different frequencies. According to this embodiment, sounds with two or more frequencies having a repellent effect can be produced, which is more effective in scaring different types of birds or animals which are different in repellent frequency.

An embodiment of the present invention is directed to an aerial vehicle (1C) further including a frequency changing system (60C) configured to change the frequency of sound produced by the sound producing structure (40C). According to this embodiment, the frequency of produced sound can be changed to one with a repellent effect on a bird or animal to be scared, so that the bird or animal can be more effectively driven away.

An embodiment of the present invention is directed to an aerial vehicle (1, 1A, 1B, 1C) having a sound producing structure (40, 40A, 40B, 40C) further including a flow outlet (42, 44, 42A, 42B, 43B, 451B, 46B, 42C) out of which air having flowed in from an opening (41, 43, 41A, 41B, 44B, 41C) flows. According to this embodiment, the distance between the opening (41, 43, 41A, 41B, 44B, 41C) and the flow outlet. (42, 44, 42A, 42B, 43B, 45B, 46B, 42C) can be adjusted to change the frequency of sound output from the sound producing structure (40, 40A, 40B, 40C), which makes it easy to adjust the frequency of sound.

An embodiment of the present invention is directed to an aerial vehicle (1C) further including a plugging system. (60C) capable of plugging at least one of an opening (41C) or a flow outlet (42C). According to this embodiment, the output of sound from the sound producing structure (40C) can be suppressed when the opening (41C) or the flow outlet (42C) is plugged.

An embodiment of the present invention is directed to an aerial vehicle (1C) having a plugging system (60C) configured to plug at least one of an opening (41C) or a flow outlet (42C) when the aerial vehicle (1C) has a flight altitude lower than a predetermined altitude. According to this embodiment, the output of sound can be suppressed when the aerial vehicle (1C) flies close to the ground, which makes it possible to prevent noise pollution in an environment where citizens live while birds and animals are driven away.

An embodiment of the present invention is directed to an aerial vehicle (1C) further including a camera (102) configured to detect a predetermined target, in which a plugging system (60C) is controlled to control the output of sound from a sound producing structure (40C) based on detection of the predetermined target the camera (102). According to this embodiment, sound can be output from the sound producing structure (40C) only when a bird or animal as a monitoring target is detected.

An embodiment of the present invention is directed to an aerial vehicle (1C) having a plugging system (60C) configured to plug at least one of an opening (41C) or a flow outlet (42C) when the distance between the aerial vehicle (1C) and a target detected by a camera (102) is longer than a predetermined distance and to unplug the opening (411C) and the flow outlet (42C) when the distance is shorter than the predetermined distance. According to this embodiment, the sound producing structure (40C) can output sound only when a bird or animal as a monitoring target comes close, which makes it possible to keep the occurrence of noise pollution to a minimum and to prevent the aerial vehicle (10) from coming into contact with a bird or animal.

An embodiment of the present invention is directed to an aerial vehicle (1C) further including a camera (102) configured to detect a predetermined target, in which a frequency changing system (60C) is controlled for production of sound with a frequency set for the predetermined target based on detection of the predetermined target by the camera (102). According to this embodiment, the frequency can be changed to one with a repellent effect on a bird or animal detected by the camera (102), so that the bird or animal can be more effectively driven away.

An embodiment of the present invention is directed to an aerial vehicle (1, 1A, 1B, 1C) having an air flow generator (19) including a rotor (20), in which the air flow generator (20) generates an air flow when the rotor (20) rotates. According to this embodiment, a simpler system is available to produce sound for scaring birds and animals.

An embodiment of the present invention is directed to an aerial vehicle (1, 1B, 1C) further including: a main body (11); plural arms (12, 12B, 12C) extending from the main body (11) and supporting air flow generators (19); and an extension (31, 31B, 31C) extending from the distal end of each of the arms (12, 12E, 12C) in a direction away from the main body (11) in plan view, in which at least one of the arm (12, 12B, 12C) or the extension (31, 31B, 31C) is provided with a sound producing structure (40, 40B, 40C). According to this embodiment, the arm (12, 12B, 12C) or the extension (31, 31B, 31C) provided with an opening (41, 43, 41B, 44B, 41C) and the like of the sound producing structure (40, 40B, 40C) contributes to a reduction in the total weight of the aerial vehicle (1, 1B, 1C) and to a further reduction in electric power consumed to scar birds and animals.

While embodiments of the present invention have been described above, the embodiments described above are not intended to limit the present invention and may be altered or modified within the scope of the present invention for achieving the object.

In the first, second, and third embodiments, any number of sound producing structures 40, 40A, 40B may be configured to produce different frequencies, in which all sound producing structures 40, 40A, 40B may be configured to produce sounds with different frequencies, or at least two of the sound producing structures 40, 40A, 40B may be configured to produce sounds with different frequencies.

In the fourth embodiment, the sound production control section 120C controls the frequency changing system 60C to change the frequency of sound. Alternatively, before the aerial vehicle 1C is allowed to fly, the frequency changing system 60C may be controlled so that the frequency of sound produced by the sound producing structure 40C is changed to one with a repellent effect on a specific target.

In the above embodiments, the sound producing structure 40, 40A, 40B, 40C have an opening 41, 43, 41A, 41B, 44B, 41C and a flow outlet 42, 44, 42A, 42B, 43B, 45B, 46B, 42C to produce sound. Alternatively, the sound producing structure 40, 40A, 40B, 40C may be configured to produce sound with the opening 41, 43, 41A, 41B, 44B, 41C taking in air without the flow outlet 42, 44, 42A, 423, 43B, 45B, 46B, 42C.

In the fourth embodiment, the output of sound is suppressed by plugging the flow outlet 42C. Alternatively, the output of sound may be suppressed by plugging the opening 41C or by plugging both the opening 41C and the flow outlet 42C.

In the aerial vehicle 1, 1B according to the first or third embodiment, the opening 41, 43, 41B, 44B and the flow outlet 42, 44, 42B, 43B, 45B, 46B are provided in each of the arm 12, 12B and the guard extension 31, 31B. Alternatively, the opening 41, 43, 41B, 44B and the flow outlet 42, 44, 42B, 43B, 45B, 46B may be provided in only the arm 12, 12B or only the guard extension 31, 31B.

In the aerial vehicle 1A according to the second embodiment, the opening 41A and the flow outlet 42A are attached to each of the arm 12A and the guard extension 31A. Alternatively, the opening 41A and the flow outlet 42A may be attached to only the arm 12A or only the guard extension 31A.

Each embodiment shows an unmanned aerial vehicle as an example of the aerial vehicle. It will be understood that the unmanned aerial vehicle is a non-limiting example. For example, the present invention may also be applied to an aerial vehicle for pilotless transportation of a person or persons to a destination.

EXPLANATION OF REFERENCE NUMERALS 1, 1A, 1B, 1C: aerial vehicle, 19: air flow generator, 40, 40A, 40B, 40C: sound producing structure, 41, 43, 41A, 41B, 44B, 41C: opening

The invention claimed is:
1. An aerial vehicle comprising: at least one air flow generator configured to generate an air flow for lifting;
at least one sound producing structure having an opening below the air flow generator and configured to produce sound when the air flow causes air to flow into the opening, wherein the sound producing structures include hollows that generate vortexes producing specific frequencies upon application of an air flow;
further comprising a frequency changing system configured to change a frequency of sound produced by the sound producing structure, wherein changing the frequency includes adjusting a shape of at least one hollow;
further comprising a plugging system capable of plugging at least one of the opening or the flow outlet, wherein the plugging system is configured to plug at least one of the opening or the flow outlet when the aerial vehicle has a flight altitude lower than a predetermined altitude; and
wherein the sound producing structure further comprises a flow outlet out of which air having flowed in from the opening flows.

2. The aerial vehicle according to claim 1, wherein a plurality of the sound producing structures are disposed at positions corresponding to positions of a plurality of the air flow generators.

3. The aerial vehicle according to claim 2, wherein at least two of the sound producing structures are configured to produce sounds with different frequencies.

4. The aerial vehicle according to claim 1, further comprising a detector configured to detect a predetermined target, wherein
the plugging system is controlled to control output of sound from the sound producing structure based on detection of the predetermined target by the detector.

5. The aerial vehicle according to claim 4, wherein the plugging system is configured to plug at least one of the opening or the flow outlet when a distance between the aerial vehicle and the target detected by the detector is longer than a predetermined distance and to unplug the opening and the flow outlet when the distance is shorter than the predetermined distance.

6. The aerial vehicle according to claim 1, further comprising a detector configured to detect a predetermined target, wherein
the frequency changing system is controlled for production of sound with a frequency set for the predetermined target based on detection of the predetermined target by the detector.

7. The aerial vehicle according to claim 1, wherein the air flow generator has a rotor, and the air flow generator generates an air flow when the rotor rotates.

8. The aerial vehicle according to claim 7, wherein the sound producing structure is located inside a trajectory of rotation of the rotor when viewed in a direction of a rotational axis of the rotor.

9. The aerial vehicle according to claim 1, further comprising:
a main body;
a plurality of supports extending from the main body and each supporting the air flow generator; and
an extension extending from a distal end of each of the supports in a direction away from the main body in plan view, wherein
at least one of the support or the extension is provided with the sound producing structure.

10. The aerial vehicle according to claim 1, wherein at least two of the sound producing devices are tuned to generate different frequencies.

11. The aerial vehicle according to claim 10, wherein each frequency of the different frequencies is tuned to repel a specific type of animal different from the other frequencies.

12. The aerial vehicle according to claim 1, wherein changing the frequency of sound produced by the sound producing structure does not affect a power produced by the air flow generator.

13. The aerial vehicle according to claim 1, wherein changing the frequency of sound produced by the sound producing structure comprises increasing a produced frequency by decreasing a length of the hollow, and decreasing a frequency by increasing a length of the hollow.

* * * * *